(12) United States Patent
Hagino

(10) Patent No.: US 7,889,267 B2
(45) Date of Patent: Feb. 15, 2011

(54) FOCUS STATE DISPLAY APPARATUS AND FOCUS STATE DISPLAY METHOD

(75) Inventor: Yoshio Hagino, Chiba (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 495 days.

(21) Appl. No.: 11/600,209

(22) Filed: Nov. 16, 2006

(65) Prior Publication Data

US 2007/0092141 A1  Apr. 26, 2007

Related U.S. Application Data

(62) Division of application No. 10/544,727, filed on Aug. 5, 2005.

(51) Int. Cl.
G03B 13/00 (2006.01)
G06K 9/20 (2006.01)
H04B 1/38 (2006.01)
H04W 4/00 (2009.01)

(52) U.S. Cl. ............... 348/345; 348/349; 382/321; 455/560; 455/422.1

(58) Field of Classification Search ......... 348/345, 348/349, 207, 99; 382/321; 706/45; 455/506, 455/422.1
See application file for complete search history.

(56) References Cited

U.S. PATENT DOCUMENTS

| | | | |
|---|---|---|---|
| 4,599,653 A | 7/1986 | Kimura et al. | |
| 5,363,164 A * | 11/1994 | Kobayashi et al. | 396/77 |
| 5,887,086 A * | 3/1999 | Tokano | 382/312 |
| 5,959,260 A | 9/1999 | Hoghooghi et al. | |
| 6,463,220 B1 * | 10/2002 | Dance et al. | 396/431 |
| 6,532,035 B1 * | 3/2003 | Saari et al. | 348/14.02 |
| 2001/0044324 A1 | 11/2001 | Carayiannis et al. | |
| 2002/0058536 A1 | 5/2002 | Horii et al. | |
| 2002/0114015 A1 | 8/2002 | Fujii et al. | |
| 2002/0170970 A1 | 11/2002 | Ehrhart | |
| 2003/0118245 A1 * | 6/2003 | Yaroslavsky et al. | 382/255 |
| 2003/0223009 A1 * | 12/2003 | Yoshida et al. | 348/349 |

FOREIGN PATENT DOCUMENTS

| | | |
|---|---|---|
| CN | 1222720 A | 7/1999 |
| CN | 1353557 A | 6/2002 |
| EP | 0 678 822 A2 | 10/1995 |

(Continued)

*Primary Examiner*—Lin Ye
*Assistant Examiner*—Mekonnen Dagnew
(74) *Attorney, Agent, or Firm*—Birch, Stewart, Kolasch & Birch, LLP

(57) ABSTRACT

A focus state display apparatus comprising focus area extraction means for extracting the image signals of a predetermined area from photographed image signals, edge enhancement processing means for enhancing the edge of the extracted image signals, time integration value calculation means for calculating an integration value of the edge-enhanced image signals in a certain period of time, focus state determination means for determining the focus state of the photographed image signals on the basis of the calculated integration value, and focus state display means for displaying the determined focus state. A user is capable of readily determining the focus state of a camera and confirming and adjusting the focus thereof with accuracy even in a display apparatus of a camera-equipped portable terminal device, where the size and resolution thereof are limited.

13 Claims, 25 Drawing Sheets

FOREIGN PATENT DOCUMENTS

| | | |
|---|---|---|
| EP | 0 926 528 A2 | 6/1999 |
| EP | 1 205 790 A2 | 5/2002 |
| EP | 1 250 002 A1 | 10/2002 |
| JP | 3-11884 A | 1/1991 |
| JP | 5-127244 A | 5/1993 |
| JP | 6-201983 A | 7/1994 |
| JP | 6-59813 U | 8/1994 |
| JP | 7-191257 A | 7/1995 |
| JP | 10-96990 A | 4/1998 |
| JP | 11-194379 A | 7/1999 |
| JP | 11-231847 A | 8/1999 |
| JP | 11-266388 A | 9/1999 |
| JP | 2000-29120 A | 1/2000 |
| JP | 2000-125179 A | 4/2000 |
| JP | 2001-136419 A | 5/2001 |
| JP | 2001-174900 A | 6/2001 |
| JP | 2002-23241 A | 1/2002 |
| JP | 2002-135451 A | 5/2002 |
| JP | 2002-176509 A | 6/2002 |
| JP | 2002-196225 A | 7/2002 |
| JP | 2002-209135 A | 7/2002 |
| JP | 2002-214518 A | 7/2002 |
| JP | 2002-223381 A | 8/2002 |
| JP | 2002-258143 A | 9/2002 |
| JP | 2002-311489 A | 10/2002 |
| JP | 2002-335437 A | 11/2002 |
| JP | 2002-341236 A | 11/2002 |
| JP | 2002-350958 A | 12/2002 |
| JP | 2002-365526 A | 12/2002 |
| KR | 2001-0044472 A | 6/2001 |
| KR | 2001-0107312 A | 12/2001 |
| WO | WO-02/01270 A2 | 1/2002 |
| WO | WO-02/19688 A2 | 3/2002 |

* cited by examiner

EXAMPLE OF SPATIAL DIFFERENTIATION OPERATORS $$[-1 \ \ 2 \ \ -1]  \quad \begin{bmatrix} 0 & -1 & 0 \\ -1 & 4 & -1 \\ 0 & -1 & 0 \end{bmatrix} \quad \begin{bmatrix} -1 & 0 & 1 \\ -2 & 0 & 2 \\ -1 & 0 & 1 \end{bmatrix} \quad \begin{bmatrix} -1 & -2 & -1 \\ 0 & 0 & 0 \\ 1 & 2 & 1 \end{bmatrix}$$

OPERATOR 1     OPERATOR 2     OPERATOR 3     OPERATOR 4

$$\begin{bmatrix} -1 \\ 2 \\ -1 \end{bmatrix} \quad \begin{bmatrix} -1 & -1 & -1 \\ -1 & 8 & -1 \\ -1 & -1 & -1 \end{bmatrix}$$

OPERATOR 5     OPERATOR 6

FIG. 9
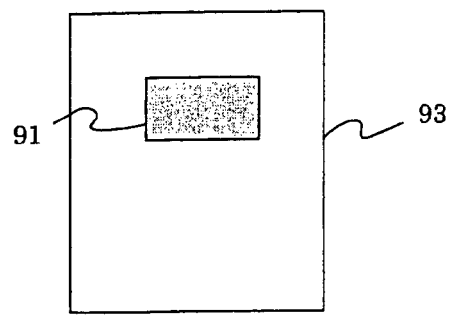
FIG. 10
EXAMPLE OF COLOR TABLE
| 0 : RED |
| :---: |
| . |
| 256: GREEN |
FIG. 11
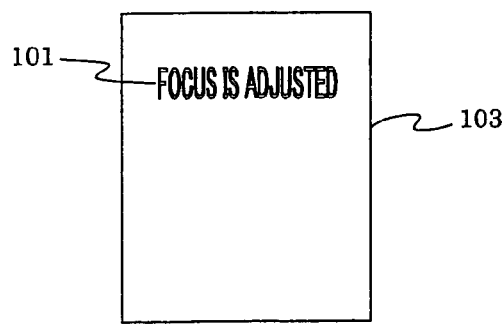

FOCUS STATE DISPLAY APPARATUS AND FOCUS STATE DISPLAY METHOD

This application is a Divisional of co-pending application Ser. No. 10/544,727 filed on Aug. 5, 2005, and for which priority is claimed under 35 U.S.C. §120; the entire contents of all are hereby incorporated by reference.

TECHNICAL FIELD

The present invention relates to an apparatus for displaying the focus state of a camera and a display method thereof, especially to a technique for displaying the focus state of a small portable camera and a fixed-focus camera disposed in a camera-equipped portable terminal device, such as a portable telephone equipped with an imaging function.

BACKGROUND ART

In recent years, with the development of image sensors having small size and low power consumption, portable devices with a built-in camera, such as PDAs (Personal Digital Assistants), portable telephones, and portable PCs (personal computers) have been in widespread use.

These portable devices are capable of photographing images and printed materials instead of taking notes, for example, using a camera such as a built-in CCD camera. Also, they are capable of storing such photographed images in the portable devices and transmitting the photographed images to other portable devices and PCs through the Internet via an electronic mail function of the portable devices.

Cameras built in such portable devices are manufactured such that they are as small and light in weight as possible. In general, cameras having resolution lower than that of normal digital cameras, namely, about 100 thousand to 300 thousand effective pixels are used.

Also, cameras built in portable terminal devices involve severe limitation in terms of a case size and costs, so that, in general, an automatic focus device is not built in. When a user photographs an image using such a built-in camera, an image in the photographing range of the built-in camera is displayed on a display screen, such as an LCD (liquid crystal display) disposed in a portable terminal device. Thus, it is possible to photograph adjusting the focus while confirming the display screen.

In order to adjust the focus upon photographing, although the focusing may be performed while the user confirms the display screen as mentioned above, the focusing may also be performed such that a focus state is displayed by the portable terminal device, while the user confirms the display of the focus state as well as the display screen. The portable terminal device can comprise a function for displaying the focus state on the basis of the signal components of an image received using the built-in camera.

An imaging apparatus described in Patent Document 1 (JP Patent Publication (Kokai) No. 3-11884 A (1991)) relates to an imaging apparatus such as a video camera having a viewfinder and focus control means. The apparatus comprises a focus state display apparatus for displaying a focus state upon manual focusing based on the ratio of high frequency components to low frequency components of photographed image signals.

A focus state display apparatus and the microscope apparatus described in Patent Document 2 (JP Patent Publication (Kokai) No. 2002-196225 A) comprises a focus state display apparatus by which the high-frequency components of spatial frequencies of image data are extracted to generate differential image data, coloration is changed in accordance with pixel values indicating the high-frequency components of the data, and a focus state is notified using the difference of color.

DISCLOSURE OF THE INVENTION

A display apparatus such as an LCD disposed in such a camera-equipped portable terminal device is small and has a small number of pixels, so that a displayed image is coarse. Thus, it has been difficult to focus while determining a blur of a photographing image, for example, with the naked eyes. Also, even the focus state display apparatus as described in Patent Document 1 (JP Patent Publication (Kokai) No. 3-11884 A (1991)) and Patent Document 2 (JP Patent Publication (Kokai) No. 2002-196225 A) are provided, a displayed focus state is difficult for the user to understand and sometimes it is difficult to adjust the focus.

The present invention is made in view of such problems. It is an object of the present invention to provide a focus state display apparatus and a focus state display method that allows the user to readily determine the focus state of a camera and to confirm and adjust the focus in a precise manner even in a display apparatus of a camera-equipped portable terminal device, where the size and resolution thereof are limited.

The present invention provides a focus state display apparatus comprising focus area extraction means for extracting the image signals of a predetermined area from photographed image signals, edge enhancement processing means for enhancing the edge of the extracted image signals, time integration value calculation means for calculating an integration value of the edge-enhanced image signals in a certain period of time, focus state determination means for determining the focus state of the photographed image signals on the basis of the calculated integration value, and focus state display means for displaying the determined focus state.

The present invention also provides a focus state display apparatus comprising focus area extraction means for extracting the image signals of a certain area from photographed image signals, edge enhancement processing means for enhancing the edge of the extracted image signals, histogram preparation means for preparing a histogram of the edge-enhanced image signals, variance value calculation means for calculating a variance value regarding those image signals not less than a certain threshold value in the prepared histogram, time integration value calculation means for calculating an integration value of the calculated variance value of the image signals in a certain period of time, focus state determination means for determining the focus state of the photographed image signals on the basis of the calculated integration value, and focus state display means for displaying the determined focus state.

In the focus state display apparatus of the present invention, the focus state display means is characterized in that it displays in a quantitative or qualitative manner. In this case, quantitative display involves displaying the magnitude of the value of the focus state calculated in the focus state display apparatus, where as the value becomes larger, the focus is more correctly adjusted. Also, qualitative display involves varying the form of display depending on the magnitude of the value of the aforementioned focus state.

This enables displaying the focus state in various forms that are readily understandable to the user. The user is capable of adjusting the focus of a photographing image, moving and operating an imaging apparatus while viewing the display of the focus state.

In the focus state display apparatus of the present invention, examples of quantitative display of the focus state via the focus state display means include forms where the focus state of the photographed image signals is displayed using a bar graph, a level meter, numerical values, the number of graphic forms, and the like.

Further, when performing the quantitative display of the aforementioned focus state, it is preferable to display the maximum value of the focus state of the photographed image signals from the start of photographing to the present time along with the current focus state.

By contrast, in the focus state display apparatus of the present invention, examples of qualitative display of the focus state via the focus state display means include forms below.

A form of the focus state display apparatus further comprising light emitting means, where the focus state display means displays the focus state of the photographed image signals by blinking or lighting the light emitting means.

A form of the focus state display apparatus further comprising sound-producing means for uttering a sound or a voice, where the focus state display means displays the focus state of the photographed image signals by causing the sound-producing means to produce a sound or a voice.

A form of the focus state display apparatus further comprising filter means for removing the high-frequency components of the spatial frequency components of the photographed image signals, where the focus state display means modifies the range of spatial frequency components to be removed from the image signals via the filter means, depending on the focus state of the photographed image signals.

A form where the focus state display means displays the focus state of the photographed image signals using the colors of a display image, the density of display characters, and the like.

Further, the present invention provides a camera comprising imaging means for photographing an image, image display means for displaying the image photographed via the imaging means, and any one of the aforementioned focus state display apparatuses, and a portable terminal device having the camera.

The present invention also provides a focus state display method including the steps of extracting the image signals of a predetermined area from photographed image signals, enhancing the edge of the extracted image signals, calculating an integration value of the edge-enhanced image signals in a certain period of time, determining the focus state of the photographed image signals on the basis of the calculated integration value, and displaying the determined focus state.

The present invention also provides a focus state display method including the steps of extracting the image signals of a certain area from photographed image signals, enhancing the edge of the extracted image signals, preparing a histogram of the edge-enhanced image signals, calculating a variance value regarding those image signals not less than a certain threshold value in the prepared histogram, calculating an integration value of the calculated variance value of the image signals in a certain period of time, determining the focus state of the photographed image signals on the basis of the calculated integration value, and displaying the determined focus state.

The present invention also provides a program including the steps of extracting the image signals of a predetermined area from photographed image signals, enhancing the edge of the extracted image signals, calculating an integration value of the edge-enhanced image signals in a certain period of time, determining the focus state of the photographed image signals on the basis of the calculated integration value, and displaying the determined focus state.

The present invention also provides a program including the steps of extracting the image signals of a certain area from photographed image signals, enhancing the edge of the extracted image signals, preparing a histogram of the edge-enhanced image signals, calculating a variance value regarding those image signals not less than a certain threshold value in the prepared histogram, calculating an integration value of the calculated variance value of the image signals in a certain period of time, determining the focus state of the photographed image signals on the basis of the calculated integration value, and displaying the determined focus state.

The present invention further provides a recording medium in which either of the aforementioned programs is recorded.

Moreover, the present invention provides a focus state determination apparatus comprising edge detection means for detecting the edge of photographed image signals, time integration value calculation means for calculating an integration value of the difference of adjacent image signals in a certain period of time, the edge detected via the edge detection means forming a boundary, and focus state determination means for determining the focus state of the photographed image signals on the basis of the integration value calculated via the time integration value calculation means.

According to the focus state determination apparatus, it is possible to readily determine the focus state by merely time-integrating the difference of image signals such as the difference of luminance in an adjacent area with the detected edge forming a boundary. Especially, in a case where photographing targets are character codes, there is little necessity for performing edge enhancement, so that the focus state can be determined by the aforementioned edge detection alone.

Moreover, there is provided a focus state determination apparatus comprising histogram preparation means for preparing a histogram of photographed image signals, variance value calculation means for calculating a variance value regarding those image signals not less than a certain threshold value in the prepared histogram, and focus state determination means for determining the focus state of the photographed image signals on the basis of the calculated variance value of the image signals.

According to the aforementioned focus state determination apparatus, only those signals not less than a certain threshold value in the histogram are used for the focus determination. Thus, edges generated due to high frequency noises, hand movement of the user, or the like can be removed and the influence thereof can be controlled.

There is provided a focus state determination apparatus having focus state determination means for determining the focus state of characters or a bar code in a case where photographing target switching means capable of switching between a normal mode handling general images as photographing targets and an OCR function mode handling characters or bar codes as photographing targets switches to the OCR function mode, and a control portion for controlling such that it starts code recognition means for recognizing photographed characters or bar codes. The apparatus may be constituted such that it starts in an automatic manner when photographing targets are switched. Further, the apparatus may have determination means for determining whether the photographing targets are general images, characters, or bar codes.

The inventors have thought of disposing focus state display means in the focus state display apparatus, the focus state display means determining the focus state of photographed image signals and performing visual or acoustic display that is readily understandable for the user in accordance with the determined focus state.

In the following, embodiments of the present invention are described in detail with reference to the attached drawings.

FIGS. 1 to 13 show an example of the embodiments of the focus state display apparatus and the focus state display method according to the present invention. In the drawings, portions provided with the same reference represent the same element and the basic constitution thereof is the same.

BRIEF DESCRIPTION OF THE DRAWINGS

FIG. 9 shows a form where a focus state is displayed on LCD display portions 115 and 116 of a portable telephone 10 according to a first embodiment of the present invention where the value of the focus state is displayed using a color-displayed block.

FIG. 10 shows an example of the constitution of a color table for recording the relationship between the colors of blocks 91 and the value of a focus state in a display form shown in FIG. 9.

FIG. 11 shows a form where a focus state is displayed on LCD display portions 115 and 116 of a portable telephone 10 according to a first embodiment of the present invention where the value of the focus state is displayed using the density of displayed characters.

BEST MODE FOR CARRYING-OUT OF THE INVENTION

First Embodiment

Figure 1:
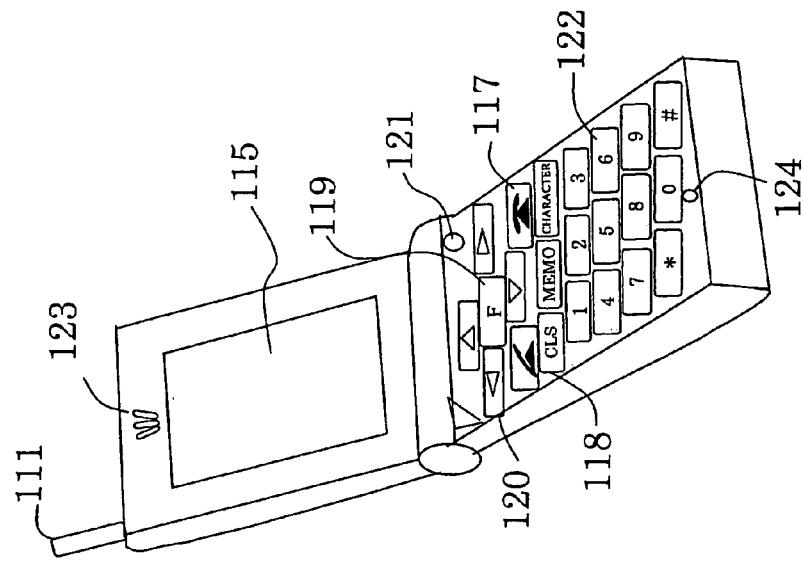
FIG. 1 shows an outward appearance of a camera-equipped portable terminal device comprising a focus state display apparatus as a first embodiment of the present invention.
Figure 1:
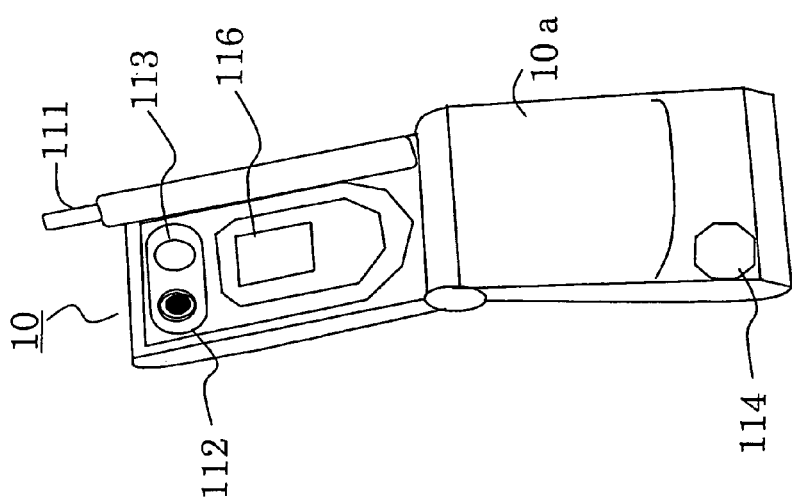
Figure 14:
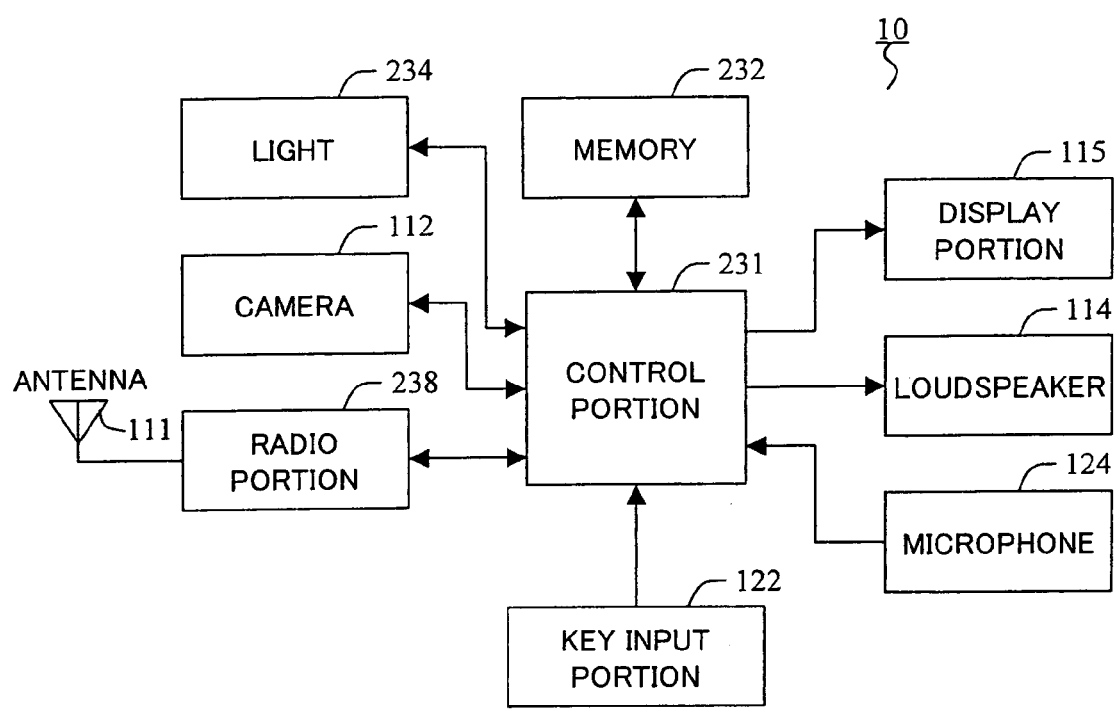
FIG. 14 shows a functional block diagram indicating an example of a schematic constitution of a portable telephone according to the embodiments of the present invention.

A first embodiment of the present invention is a camera-equipped portable telephone/PHS (Personal Handy-Phone System) comprising a focus state display apparatus (hereafter simply abbreviated as "portable telephone" so as to simplify the description). FIG. 1 shows an outward appearance of a camera-equipped portable telephone comprising a focus state display apparatus. FIG. 1(A) shows a rear perspective view of the portable telephone of the present embodiment, and FIG. 1(B) shows a front perspective view thereof. FIG. 14 shows a functional block diagram indicating an example of a schematic constitution of the portable telephone according to the present embodiment.

In FIG. 1, a camera-equipped portable telephone 10 comprises a body portion 10a and an antenna 111 for performing radio communication. The back face of the body portion 10a comprises a camera 112 (imaging means) for photographing an image, an LED (light emitting diode) 113 (light emitting means) for notifying a focus state by blinking or lighting, a loudspeaker 114 (sound-producing means) for notifying the focus state using a sound or a voice, and a small LCD (liquid crystal display) display portion 116 (display means) for displaying a subscreen.

Also, the front face of the body portion 10a comprises an LCD display portion 115 (display means) for displaying a main screen, a power supply key 117 for turning on/off a power supply, a telephone function key 118 for operating incoming calls, outgoing calls, switching of telephone functions, determination of performance, and the like, a mode key 119 for switching various functions, cursor keys 120 for moving selection objects in the up and down and right and left directions, a shatter key 121 for determining the photographing of an image to be inputted from the camera 112, dial keys 122 including membrane keys for dialing such as inputting telephone numbers, a loudspeaker 123 for voice amplification to perform call reception, and a microphone 124 for inputting a voice.

In this case, the camera 112 is a small and light camera to be disposed in portable devices. For example, the camera may be a CCD (Charge Coupled Device, an area-type solid-state imaging device) camera of 300 thousand pixels.

Moreover, LCD display portions 115 and 116 are constituted using devices such as an LCD display having a dot matrix structure, a PDP (Plasma Display Panel) as a back light, and an organic EL (Electron Luminescence), and various drivers as an interface between these devices and the inner system of the portable telephone 10.

When the portable telephone 10 is operated, guidance, reception information, images, text information, icons, and the like to perform various operations are displayed on the LCD display portions 115 and 116.

When photographing is performed using the camera 112, the focus state is displayed on the LCD display portions 115 and 116 along with an image inputted from the camera 112. When the user adjusts the position of the camera 112, the focus state of a photographing target varying in accordance therewith can be recognized. When the focus is adjusted, information thereof is displayed on the LCD display portions 115 and 116 and notified to the user by generating a predetermined sound via the loudspeaker 114 or the loudspeaker 123 for voice amplification.

In the portable telephone of the present embodiment, the aforementioned display of the focus state and the notification that the focus is adjusted can be performed by any one of, or a combination of the LCD display portions 115 and 116, the LED 113, and the loudspeaker 114 or the loudspeaker 123 for voice amplification.

As shown in FIG. 14, the portable telephone 10 according to the present embodiment comprises a CPU (control portion) 231 for controlling the entire apparatus (including photographing procedure switching means, recognition means (OCR function) for characters, codes, and the like, information processing means, frame rate control means, timer setting means, and the like), a memory 232 including semiconductor memories such as a ROM for storing a control program, fixed data, and the like, and a RAM as a storage area for the operation of the CPU, and a hard disk drive, the memory storing received or inputted character information, image information, and voice signals. The portable telephone 10 further comprises the camera 112 (imaging means) for inputting image information handled as a target, a light 234 (lighting means) for emitting light by user operation upon imaging, for example, the LCD display portion 115 (display means, a portion of output (notification) means) for displaying character information and image information to the user, the key input portion 122 for inputting and generating key operation information from the user, the antenna 111 for transmitting and receiving radio waves, a radio portion 238 for controlling the transmission and reception of radio communication, the loudspeaker 114 (a portion of output (notification) means) for outputting a voice signal, and the microphone 124 for inputting a voice signal from the user.

The control portion 231 controls the entire portable telephone 10 and also has an OCR function. The control portion photographs characters, for example, using the camera 112, displays image information, recognizes characters, for example, and performs processing in accordance with recognized contents on the basis of key operation.

Especially, the control portion 231 has photographing procedure switching means for switching at least a portion of processing between when photographing natural images, for example, and when photographing in the OCR function mode, where characters, a bar code, and the like are photographed for the purpose of character recognition (OCR), capturing, or the like. The control portion 231 further has the OCR function for recognizing characters, a bar code, and the like when the processing is switched to the OCR function mode, notification means for notifying the user of results recognized via the OCR function, for example, and a function as information processing means for performing a predetermined processing on the basis of contents recognized via the OCR function.

Moreover, the control portion 231 has a function as frame rate control means by which when the processing is switched to the OCR function mode, the control portion displays an image on the display portion 115 at a fast frame rate that can be obtained from the camera 112 until the OCR function is started, and after the OCR function is started, the image is photographed and displayed at a frame rate that is necessary for the OCR function.

The ROM is a read-only semiconductor memory for storing fixed data such as a program and communication control data necessary when the control portion 231 operates. The RAM is used as what is called a working memory for temporarily storing data concerning bar code recognition and communication, data used for calculation, calculation results, and the like. A program to be processed in the portable telephone 10 is expanded in the RAM, and then executed.

Figure 15:
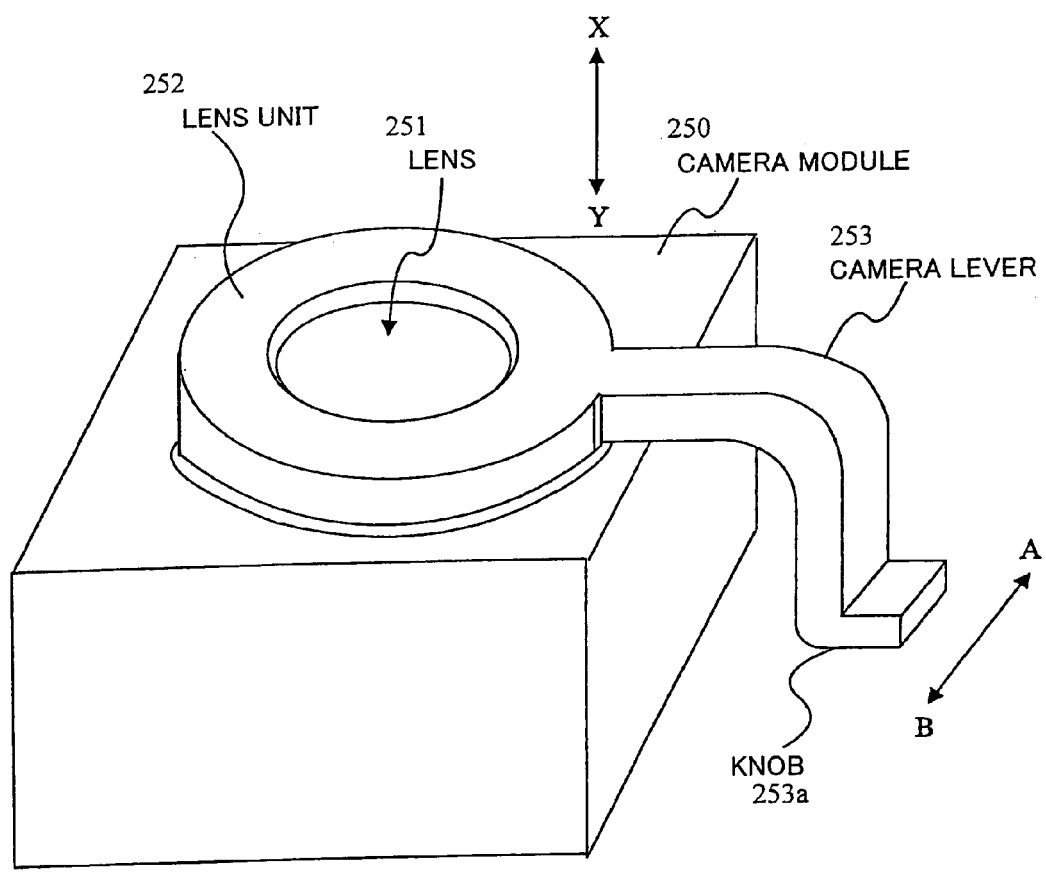
FIG. 15 schematically shows an example of a constitution of a lens focal depth switching mechanism of a camera 112, indicating an example of a focal depth switching mechanism for a normal photographing and an OCR function mode.

FIG. 15 schematically shows an example of the constitution of a lens focal depth switching mechanism of the camera 112, indicating an example of a focal depth switching mechanism for a normal photographing and the OCR function mode. As shown in FIG. 15, the lens focal depth switching mechanism comprises a camera module 250 having a solid-state imaging device such as a CCD and a signal output circuit thereof, a lens unit 252 fitted on the camera module 250 with a screw, for example, the lens unit 252 having a lens 251 in the inside thereof, and a camera lever 253 installed on the peripheral portion of the lens unit 252, the camera lever 253 turning the lens unit 252. The lens unit 252 is fitted on the camera module 250 using a screw. When a knob 253a of the camera lever 253 is moved in the A←→B direction, the lens unit 252 is moved in the X←→Y direction relative to the camera module 250. Thus, the focal distance between the lens 251 attached to the lens unit 252 and the camera module 250 is switched, so that the focal depth between the normal photographing and when the OCR function is in operation is switched. In the present embodiment, when the OCR function is in operation, the camera lever 253 slides by a driving portion (omitted in the drawings) including a solenoid that has received a driving signal from the control portion 231 (FIG. 14), for example, and then the focal depth is automatically switched. A sliding knob interlocking with the knob 253a of the camera lever 253 may be disposed on a camera body to have constitution where the switching is performed by manual operation of the user upon macro photographing when the OCR function is in operation, for example.

Figure 2:
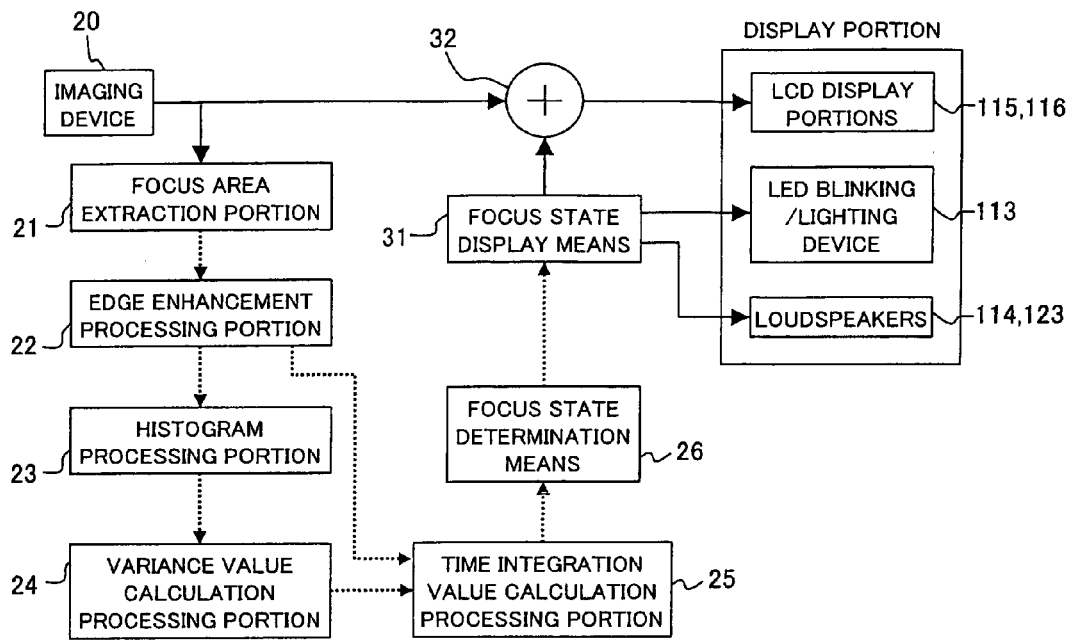
FIG. 2 shows a functional block diagram indicating the constitution of a focus state display apparatus disposed in a portable telephone 10 shown in FIG. 1.

FIG. 2 shows a functional block diagram indicating the constitution of the focus state display apparatus disposed in the portable telephone 10 of the present embodiment.

In FIG. 2, the focus state display apparatus of the present embodiment comprises an imaging device 20 (corresponding to the camera 112 of the portable telephone 10), a focus area extraction portion 21, an edge enhancement processing portion 22, a histogram processing portion 23, a variance value calculation processing portion 24, a time integration value calculation processing portion 25, focus state determination means 26, focus state display means 31, and a display image synthesis portion 32.

An image captured from the imaging device 20 is processed in the focus area extraction portion 21, the edge enhancement processing portion 22, the histogram processing portion 23, the variance value calculation processing portion 24, the time integration value calculation processing portion 25, the focus state determination means 26, and the focus state display means 31, thereby generating a display image of the focus state. The display image of the focus state and the image captured from the imaging device 20 are synthesized in the display image synthesis portion 32, and then outputted to the LCD display portions 115 and 116.

In the focus state display apparatus of the present embodiment and the camera-equipped portable telephone provided therewith, components other than described above are constituted in the same manner as conventional ones, and description thereof is omitted in this case.

Next, the operations of the portable telephone 10 and the focus state display apparatus in the present embodiment above are described with reference to FIG. 2.

When an image is photographed using the camera 112 of the portable telephone 10 of the present embodiment, the image captured in the imaging device 20 is provided with a focus area setting in the focus area extraction portion 21, and then luminance signals of image signals included in the range of the focus area are extracted.

Figure 3:
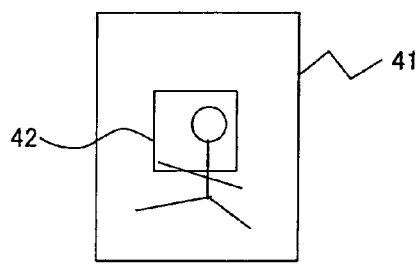
FIG. 3 schematically shows setting of a focus area and extraction of an image in a focus area extraction portion 21 shown in FIG. 2.

FIG. 3 schematically shows the setting of the focus area and the extraction of the image in this case. In FIG. 3, a rectangular focus area 42 is set in the central portion of an image 41 captured via the imaging device 20, and image signals included in the focus area 42 are extracted. The size, shape, position and the like of the focus area can be changed arbitrarily and may also be set arbitrarily by the user.

Figures 4, 5:
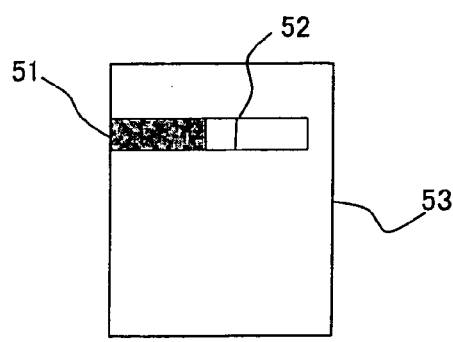
FIG. 4 shows an example of spatial differentiation operators used for edge enhancement processing of image signals in an edge enhancement processing portion 22 shown in FIG. 2.
FIG. 5 shows a form where a focus state is displayed on LCD display portions 115 and 116 of a portable telephone 10 according to a first embodiment of the present invention where the value of the focus state is displayed using a bar graph.

The luminance signals extracted in the focus area extraction portion 21 are subjected to local multiply and accumulate processing, and then subjected to absolute value processing in the edge enhancement processing portion 22 using spatial differentiation operators, thereby generating edge-enhanced image signal data. FIG. 4 shows an example of the spatial differentiation operators used in the edge enhancement processing portion 22.

After the procedure, the focus state display apparatus of the present embodiment has the following two methods to determine the focus state on the basis of the aforementioned edge-enhanced image signal data.

In the first method, in the time integration value calculation processing portion 25, a time integration value in which edge-enhanced signals in a certain period of time are integrated is calculated. In this case, a certain period of time is set as time necessary to reduce an influence resulting from a temporal fluctuation of the values of the signals above and to average the image signals. This stabilizes the determination of the focus state. Next, in the focus state determination means 26, the value of the focus state is calculated by dividing the time integration value calculated in the value calculation processing portion 25 by a predetermined value, and then by adding an offset value. If the value of the focus state is large, the focus is determined as adjusted, and if the value of the focus state is small, the focus is determined as unadjusted.

Figure 13:
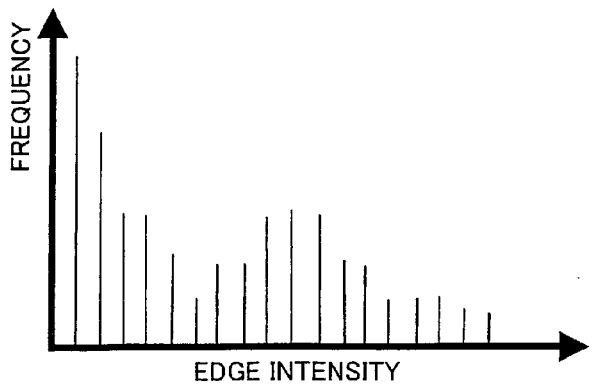
FIG. 13 shows a graph indicating a histogram generated concerning the relationship between edge intensity and frequency relative to the values of image data signals subjected to edge enhancement in a histogram processing portion 23 of FIG. 2.

In the second method, in the histogram processing portion 23, a histogram as shown in FIG. 13 is generated concerning the relationship between edge intensity and frequency relative to the values of the edge-enhanced signals. Then, in the variance value calculation processing portion 24, a variance value of signals is calculated using only those signals not less than a certain threshold value in the aforementioned histogram. Next, in the time integration value calculation processing portion 25, a time integration value is calculated in which the calculated variance value above is integrated in a certain period of time. In this case, a certain period of time is time necessary to reduce an influence resulting from a temporal fluctuation of the values of the image signals and to average the image signals in the same manner as mentioned above. However, time longer than a certain period time in the first method is set.

Next, in the focus state determination means 26, the value of the focus state is calculated by dividing the time integration value of the image signals calculated in the value calculation processing portion 25 by a predetermined value, and then by adding an offset value. If the value of the focus state is large, the focus is determined as adjusted, and if the value of the focus state is small, the focus is determined as unadjusted.

In the aforementioned second method, only those signals not less than a certain threshold value in the histogram are used in order to remove edges generated due to high frequency noises in the focus area 42, hand movement of the user, or the like and to control the influence thereof.

Also, when calculating the variance value from the histogram, a method for obtaining the variance value may be employed by which only those values not less than a certain threshold value and values not more than a certain threshold value are used. This removes edges detected based on random noises generated when photographing in the dark.

In general, when the focus of a manual camera is adjusted, the focus is adjusted by moving a focus ring. However, in a case involving a fixed-focus camera such as in a portable terminal device, the user is required to move up and down the portable terminal in order to adjust to a predetermined focal distance. Thus, in the imaging device 20 of the present embodiment, the image in the focus area 42 shown in FIG. 3 changes greatly in the up-down direction, and the time integration value of image signals is greatly fluctuated.

As mentioned above, by calculating the time integration value using the variance value calculated in the variance value calculation processing portion 24, an influence resulting from the change of the image in the focus area can be controlled, and a stable value can be calculated.

When the aforementioned first method is compared with the second method, although the first method has lower accuracy in the value of the calculated focus state than the second method, the first method is advantageous in that it takes less time for processing. By contrast, although the second method takes more time for processing than the first method, the second method is advantageous in that it has higher accuracy in the value of the calculated focus state.

In the present embodiment, either the first method or the second method may be used. Or, the time integration value may be obtained by both methods such that a value of better (higher) accuracy is employed.

Also, in the present embodiment, in the aforementioned first method and the second method, the focus area extraction portion 21 extracts the luminance signals of image signals included in the range of the focus area from an image captured in the imaging device 20. This reduces time required for the following calculation process and prevents the deterioration of accuracy in the determination of the focus state resulting from the influence of unnecessary image portions. However, the present invention is not limited to this, and in a case where a CPU capable of high-speed processing is used or there are no unnecessary image portions, the luminance signals of image signals may be extracted regarding all images captured in the imaging device 20 without performing extraction via the focus area extraction portion 21.

Also, in the present embodiment, in the aforementioned first method and the second method, by performing edge enhancement via the edge enhancement processing portion 22, accuracy in the determination of the focus state in an image having unclear edge portions is improved. However, the present invention is not limited to this. If an image having unclear edge portions does not exist, the luminance signals extracted via the focus area extraction portion 21 or the luminance signals of the image signals regarding all images captured in the imaging device 20 may be used in the following processing without performing the edge enhancement via the edge enhancement processing portion 22.

Moreover, in the present embodiment, in the aforementioned second method, the time integration value calculation processing portion 25 calculates a time integration value by integrating a variance value in a certain period of time, which is calculated via the variance value calculation processing portion 24. This reduces an influence resulting from a temporal fluctuation of the values of signals and improves the accuracy in the determination of the focus state. However, the present invention is not limited to this. The variance value calculated via the variance value calculation processing portion 24 may be used in the following process.

In the above, the value of the focus state calculated via the focus state determination means 26 is inputted into the focus state display means 31. The focus state display means 31 performs processing for displaying and notifying the focus state to the user on the basis of the value of the focus.

The focus state display means 31 generates a focus state display image corresponding to the value of the focus state, and outputs the image to the display image synthesis portion 32. Also, the focus state display means 31 can output a signal for lighting or blinking the LED blinking/lighting device 113 or a signal for causing the loudspeakers 114 and 123 to produce a sound in a predetermined occasion.

In this case, the aforementioned predetermined occasion is a case where the value of the focus state becomes the maximum value, for example, and in this occasion, the focus is adjusted in the imaging device 20. It is possible to notify the user of this information by lighting or blinking the LED blinking/lighting device 113 or causing the loudspeakers 114 and 123 to produce a predetermined sound.

In the following, an example of display of the focus state on the LCD display portions 115 and 116 is specifically described with reference to FIGS. 5 to 11. The focus state display means 31 is set in advance such that it can perform these displays.

FIGS. 5 to 11 show illustrations of forms to display the focus state on the LCD display portions 115 and 116 of the portable telephone 10 of the present embodiment, comprising the focus state display apparatus as mentioned above. In a display form shown in FIG. 5, the focus state is displayed using a bar graph. In FIG. 5, a focus state display graph 51 is displayed on a display screen 53 on the LCD display portion 115 or 116, indicating that as a gauge moves to the right, the value of the focus state becomes higher. Also, a bar 52 indicates the maximum value of the focus state so far.

On the basis of such a focus state display, the user can perform photographing, moving up and down the portable telephone 10 of the present embodiment while viewing the display screen 53 and determining a position where the gauge of the focus state display graph 51 becomes the maximum as the focus position of the camera 112.

Figure 6:
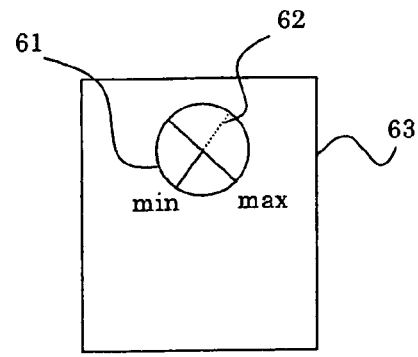
FIG. 6 shows a form where a focus state is displayed on LCD display portions 115 and 116 of a portable telephone 10 according to a first embodiment of the present invention where the value of the focus state is displayed using a level meter.

In a display form shown in FIG. 6, the focus state is displayed using a level meter. In FIG. 6, a focus state displaying level meter 61 is displayed on a display screen 63 on the LCD display portion 115 or 116, indicating that as the display level of the level meter increases clockwise from min to max, the value of the focus state becomes higher. Also, a bar 62 indicates the maximum value of the focus state so far.

On the basis of such a focus state display, the user can perform photographing, moving up and down the portable telephone 10 of the present embodiment while viewing the display screen 63 and determining a position where the display level of the focus state displaying level meter 61 becomes the maximum as the focus position of the camera 112.

Figure 7:
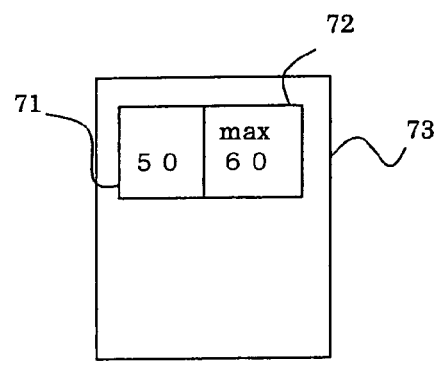
FIG. 7 shows a form where a focus state is displayed on LCD display portions 115 and 116 of a portable telephone 10 according to a first embodiment of the present invention where the value of the focus state is displayed using numerical values.

In a display form shown in FIG. 7, the focus state is displayed using numerical values. In FIG. 7, on a display screen 73 on the LCD display portion 115 or 116, a numerical value corresponding to the focus state is displayed on a display window 71, indicating that as the value of the numerical value becomes higher, the value of the focus state becomes higher. Also, a display window 72 displays the maximum value of the focus state so far.

On the basis of such a focus state display, the user can perform photographing, moving up and down the portable telephone 10 of the present embodiment while viewing the display screen 73 and determining a position where the numerical value corresponding to the focus state displayed on the display window 71 becomes the maximum as the focus position of the camera 112.

Figure 8:
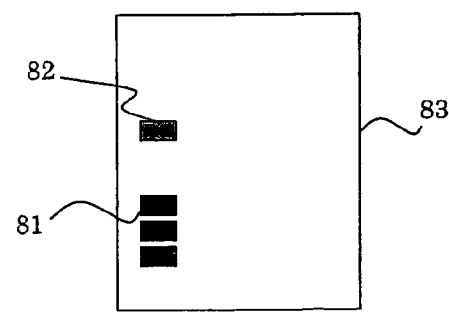
FIG. 8 shows a form where a focus state is displayed on LCD display portions 115 and 116 of a portable telephone 10 according to a first embodiment of the present invention where the value of the focus state is displayed using a predetermined number of graphic forms.

In a display form shown in FIG. 8, the focus state is displayed using the number of graphic forms. In FIG. 8, graphic forms 81 whose number corresponds to the focus state are displayed on a display screen 83 of the LCD display portion 115 or 116, indicating that as the number of the graphic forms 81 becomes greater, the value of the focus state becomes higher. In order to perform such a display, graphic forms corresponding to a quotient obtained by dividing the value of the focus state by a predetermined value may be displayed, for example. Also, a graphic form 82 displays the number of graphic forms that corresponds to the maximum value of the focus state so far.

Although rectangular quadrangles are displayed as an example in FIG. 8, other than this shape, any shape of graphic form may be used for display.

On the basis of such a focus state display, the user can perform photographing, moving up and down the portable telephone 10 of the present embodiment while viewing the display screen 83 and determining a position where the number of displayed graphic forms 81 becomes the maximum as the focus position of the camera 112.

In a display form shown in FIG. 9, the focus state is displayed using the variation of color. In FIG. 9, a block 91 whose color corresponds to the focus state is displayed on a display screen 93 on the LCD display portion 115 or 116. The color of this block 91 corresponds to the value of the focus state.

FIG. 10 shows an example of the constitution of a color table for recording the relationship between the colors of the blocks 91 and the value of the focus state in this case. Normally, the colors of the blocks 91 displayed on the display screen 93 are determined using RGB color elements. The values of these color elements may be associated with the value of the focus state and recorded in the color table.

The example shown in FIG. 10 is constituted such that as the color of the blocks 91 comes close to green, the value of the focus state becomes higher and that as the color of the blocks 91 comes close to red, the value of the focus state becomes lower. As a matter of course, display form by the focus state display apparatus of the present embodiment is not limited to this, so that color tables of any constitution can be used.

On the basis of such a focus state display, the user can perform photographing, moving up and down the portable telephone 10 of the present embodiment while viewing the display screen 93 and determining a position where the displayed blocks 91 come closest to green as the focus position of the camera 112.

In a display form shown in FIG. 11, the focus state is displayed using the density of displayed characters. In FIG. 11, the characters 101 "Focus is adjusted" are displayed on a display screen 103 on the LCD display portion 115 or 116 in density corresponding to the value of the focus state.

In this case, the density of the characters 101 is constituted such that it fluctuates within a predetermined range depending on the value of the focus state. For example, the density can be displayed in a range from 0 (black) to 255 (white). On the basis of such a focus state display, the user can perform photographing, moving up and down the portable telephone 10 of the present embodiment while viewing the display screen 103 and determining a position where the displayed characters 101 become darkest as the focus position of the camera 112.

Second Embodiment

In the present embodiment, since the constitution of the focus state display apparatus and the portable telephone 10 provided therewith is the same as in the first embodiment shown in FIGS. 1 and 2, description thereof is omitted. The first embodiment is constituted such that the focus state is displayed on the display screens of the LCD display portions 115 and 116 as shown in FIGS. 5 to 11. By contrast, the second embodiment is characterized in that, instead of or in addition to the display on the LCD display portions 115 and 116, the focus state is notified to the user by blinking or lighting the LED 113 disposed in the portable telephone 10 by a predetermined method.

As a manner for blinking the aforementioned LED 113 by a predetermined method, for example, in FIG. 2, the focus state display means 31 can be constituted such that it calculates a value obtained by dividing a predetermined value by the value of the focus state at all times and blinks the LED 113 using the calculated value as a pace. This increases the pace of the blinking of the LED 113 in proportion as the value of the focus state becomes higher, and the user can determine the focus state of the camera 112 in accordance therewith.

Also, as a manner for blinking the aforementioned LED 113 by a predetermined method, for example, in FIG. 2, the focus state display means 31 can be constituted such that it determines whether the value of the focus state is greater than a predetermined value, and causes the LED 113 to light if the value of the focus state is greater than the predetermined value. This causes the LED 113 to light when the value of the focus state exceeds the predetermined value, so that the user can determine the focus state of the camera 112 in accordance therewith.

Third Embodiment

In the present embodiment, since the constitution of the focus state display apparatus and the portable telephone 10 provided therewith is the same as in the first embodiment shown in FIGS. 1 and 2, description thereof is omitted. The first embodiment is constituted such that the focus state is displayed on display screens, namely, the LCD display portions 115 and 116 as shown in FIGS. 5 to 11. By contrast, the second embodiment is characterized in that, instead of or in addition to the display on the LCD display portions 115 and 116, the focus state is notified to the user by causing the loudspeaker 114 or 123 disposed in the portable telephone 10 to produce a predetermined sound.

As a manner for causing the aforementioned loudspeaker 114 or 123 to produce the predetermined sound, for example, in FIG. 2, the focus state display means 31 can be constituted such that it calculates a value obtained by dividing a predetermined value by the value of the focus state at all times and causes the loudspeaker 114 or 123 to produce a sound whose frequency corresponds to the calculated value. This raises the frequency of the sound emitted via the loudspeaker 114 or 123 in proportion as the value of the focus state becomes higher, and the user can determine the focus state of the camera 112 in accordance therewith.

Also, as a manner for causing the aforementioned loudspeaker 114 or 123 to produce the predetermined sound, for example, in FIG. 2, the focus state display means 31 can be constituted such that it determines whether the value of the focus state is greater than a predetermined value, and causes the loudspeaker 114 or 123 to produce the predetermined sound if the value of the focus state is greater than the predetermined value. This causes the loudspeaker 114 or 123 to produce the predetermined sound when the value of the focus state exceeds the predetermined value, so that the user can determine the focus state of the camera 112 in accordance therewith.

Fourth Embodiment

Figure 12:
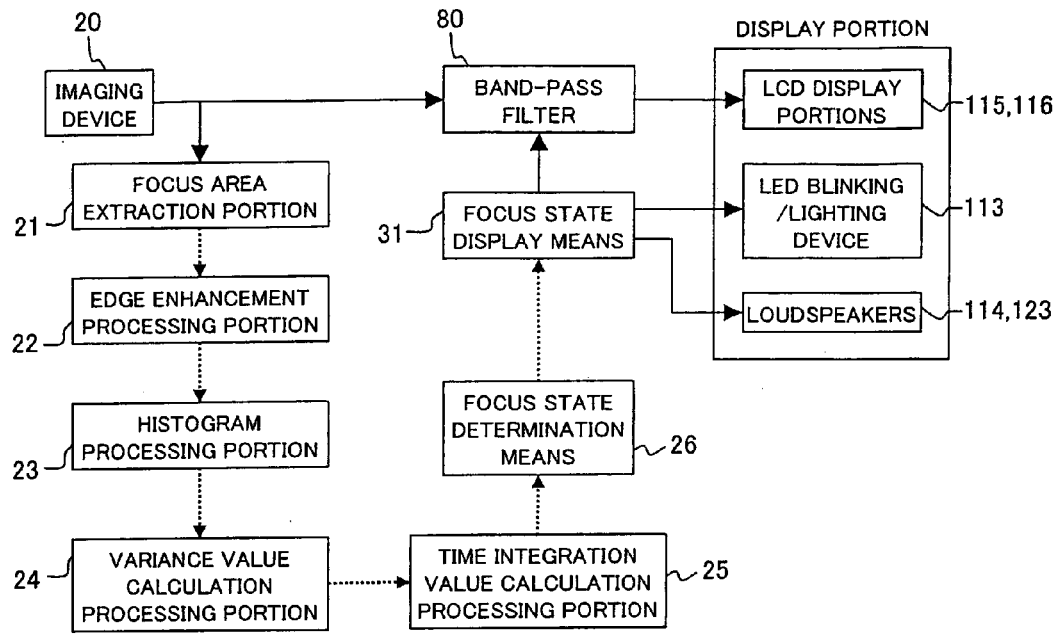
FIG. 12 shows a functional block diagram indicating the constitution of a focus state display apparatus disposed in a camera-equipped portable telephone as a fourth embodiment of the present invention.

A fourth embodiment of the present invention is a camera-equipped portable telephone comprising a focus state display apparatus in the same manner as in the first embodiment. FIG. 12 shows a functional block diagram indicating the constitution of the focus state display apparatus disposed in the portable telephone. In the figure, components provided with the same reference in FIG. 2 indicate the same element and description thereof is omitted.

In FIG. 12, the focus state display apparatus of the present embodiment comprises a BPF (band-pass filter) 80 (filter means) for removing the high-frequency components of the spatial frequency components of image data signals instead of the display image synthesis portion 32 shown in FIG. 2.

The BPF 80 applies orthogonal transformation such as FFT (fast Fourier transform), DCT (discrete cosine transform), and Hadamard transform to image data signals outputted from the imaging device 20 in each of 8×8 and 16×16 pixel blocks, for example. After inverse transformation using only those frequency components in a predetermined range of each bock, the image data signals can be outputted to the LCD display portions 115 and 116.

The focus state display means 31 controls the BPF 80 such that it expands the range (high-frequency components) of frequency components to be removed from the image data signals in the BPF 80 in proportion as the value of the focus state outputted from the focus state determination means 26 becomes low. In the above, a manner where the range of frequency components to be removed from the image data signals via the BPF 80 depending on the value of the focus state may be as follows, for example.

The focus state display means 31 calculates a value obtained by dividing the value of the focus state by a predetermined value. After the BPF 80 orthogonally transforms the image data signals in each pixel block, the BPF 80 obtains the aforementioned value calculated via the focus state display means 31. Then, from the spatial frequency components included in the image data signals, the BPF 80 extracts lower frequency components successively so that the ratio of the number of the extracted frequency ones to the total is equal to the ratio value (percentage, for example) corresponding to the aforementioned value, transforms inversely the extracted frequency ones with other frequency components set to 0, and outputs them to the LCD display portions 115 and 116.

On the basis of such a focus state display, the user can perform photographing, moving up and down the portable telephone 10 of the present embodiment while viewing the display screens of the LCD display portions 115 and 116 and intuitively determining a position where a blur of a displayed image is small as the focus position of the camera 112.

According to the camera-equipped portable telephone and the focus state display apparatus disposed therein in each of the embodiments above, after image data signals captured from the camera 112 are subjected to a predetermined processing in the focus area extraction portion 21, the edge enhancement processing portion 22, the histogram processing portion 23, the variance value calculation processing portion 24, the time integration value calculation processing portion 25, and the like, the focus state thereof is determined via the focus state determination means 26. And the focus state can be displayed or notified in an intuitive method that is readily understandable to the user via the focus state display means 31 through the LCD display portions 115 and 116, the LED 113, and the loudspeakers 114 and 123.

This allows the user who intends to photograph an image using the portable telephone 10 to readily confirm and adjust the focus by referring to the focus state displayed in a visual or acoustic manner.

Fifth Embodiment

In the present embodiment characters are included in the photographing targets. The "characters" in this case include codes such as bar codes in addition to general languages and characters. In other words, the characters mean display in which the photographing targets per se are arranged to have a general or universal meaning.

Nowadays, the improvement of the functions of camera-equipped portable telephones is remarkable. For example, the development of portable telephones having a number of pixels at 100 thousand pixel level is in progress. Also, with the improvement of the number of pixels, various applications that have been difficult in the past have become possible. One of them is thought to be mounting an OCR function on portable telephones. However, the number of pixels of conventional portable telephones is about 100 thousands, so that it has been difficult to directly photograph items printed on name cards, for example, namely characters such as names, company names, telephone/fax numbers, mail addresses, and the like using a camera disposed in the portable telephones and to obtain the characters in the portable telephones.

The portable telephone of the present embodiment employs the focus state display apparatus according to each of the aforementioned embodiments. In the camera-equipped portable telephone, by improving the number of pixels of a digital camera to a million pixel level, the number of pixels is equivalent to that of a small digital still camera and imaging having a picture quality satisfactory to the user becomes possible. The inventors thought that by disposing an OCR function in such a camera-equipped portable telephone that is highly pixelated, although conventional portable telephones have difficulty, it becomes possible to directly photograph characters such as names, company names, telephone/fax numbers, mail addresses, and the like using a camera disposed in the portable telephone, obtain them in the portable telephone, thereby storing in a memory, and to directly make a phone call or send a mail on the basis of the obtained telephone numbers and mail addresses. In this occasion, if the number of pixels becomes large, it becomes possible to photograph long character strings (such as URLs) with a distant focus distance.

However, when trying to recognize a long character string at a time, characters per se become small, so that a camera is preferably capable of changing from a general photographing mode to a close-up mode with ease. However, in conventional apparatuses, technical consideration is not given in this respect. Also, in order to photograph a small character string in a good state and recognize it accurately, preferably, the character string as a photographing target upon photographing is accurately positioned on the display screen. However, in conventional apparatuses, technical consideration is not given in this respect either.

Figure 32:
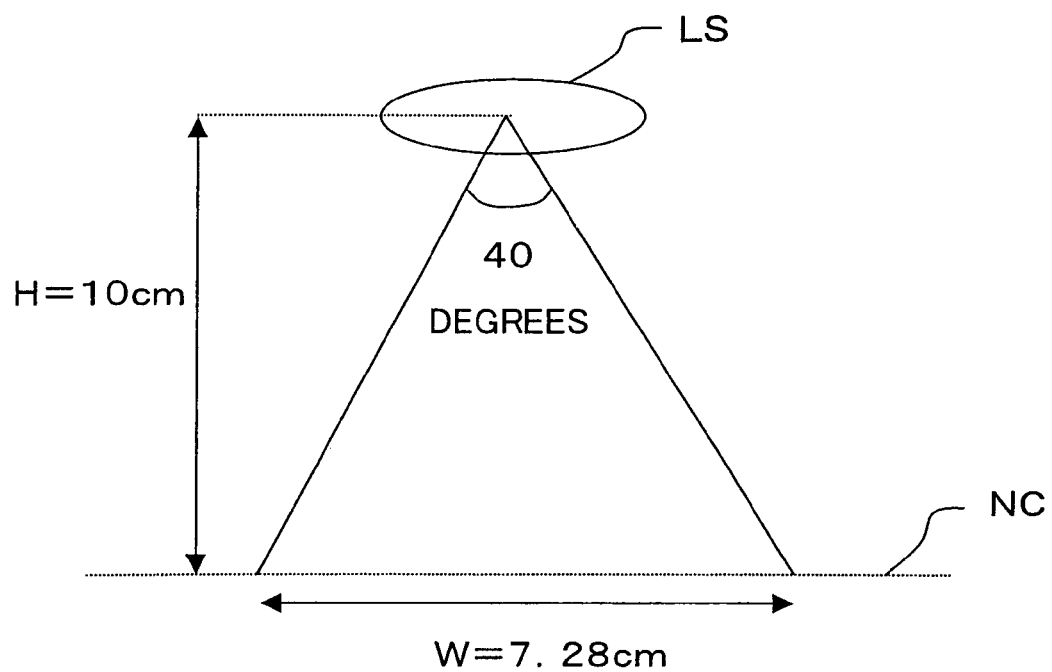
FIG. 32 illustratively shows a manner where a URL printed on a name card, for example, is photographed using a camera-equipped portable telephone according to the present embodiment.

FIG. 32 illustratively shows a manner where a URL printed on a name card, for example, is photographed using the camera-equipped portable telephone according to the present embodiment. As shown in FIG. 32, when the angle of view of a lens LS is 40° and a distance H where the focus is adjusted in a close-up state is 10 cm, the width W of a photographic subject capable of photographing is 7.28 cm. In this width, a URL printed on a name card NC, for example, can be photographed at a time. However, a character string displayed on display means (both a main LCD and a sub LCD) becomes small, so that it becomes very difficult to confirm whether the focus is adjusted or not, where the focus state display means according to each of the embodiments above performs effectively.

In the following, the camera-equipped portable telephone comprising the focus state display apparatus according to the fifth embodiment of the present invention is described with reference to the drawings. FIGS. 16 to 20 show flow chart diagrams describing, with the focus on the OCR function, the flow of processing in the camera-equipped portable telephone comprising the focus state display apparatus according to the present embodiment. FIGS. 21 to 31 show contents displayed on the display means in the flow of processing.

Figure 21:
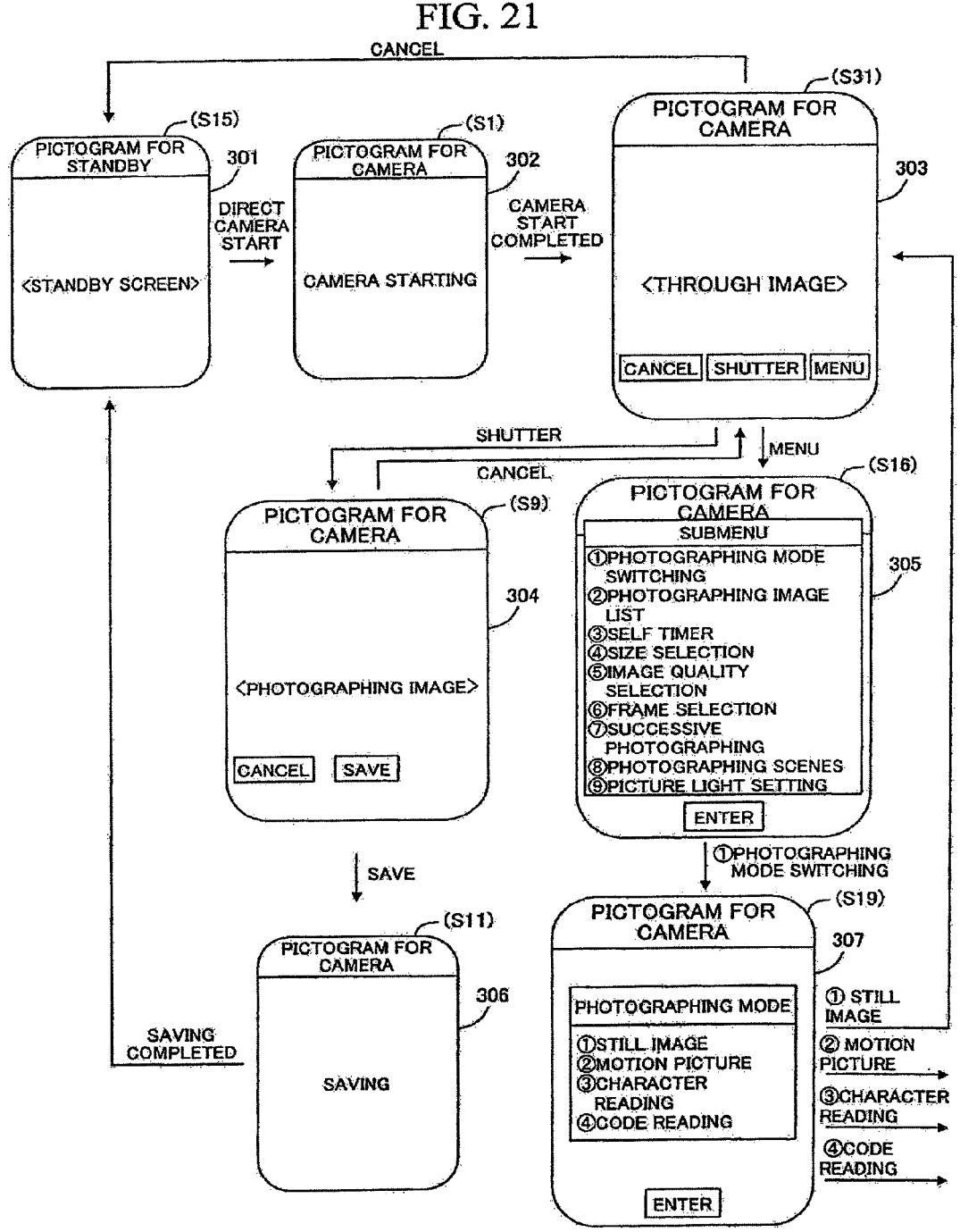
FIG. 21 shows contents displayed on display means in the flow of processing in a camera-equipped portable telephone comprising a focus state display apparatus according to a fifth embodiment of the present invention.
Figure 22:
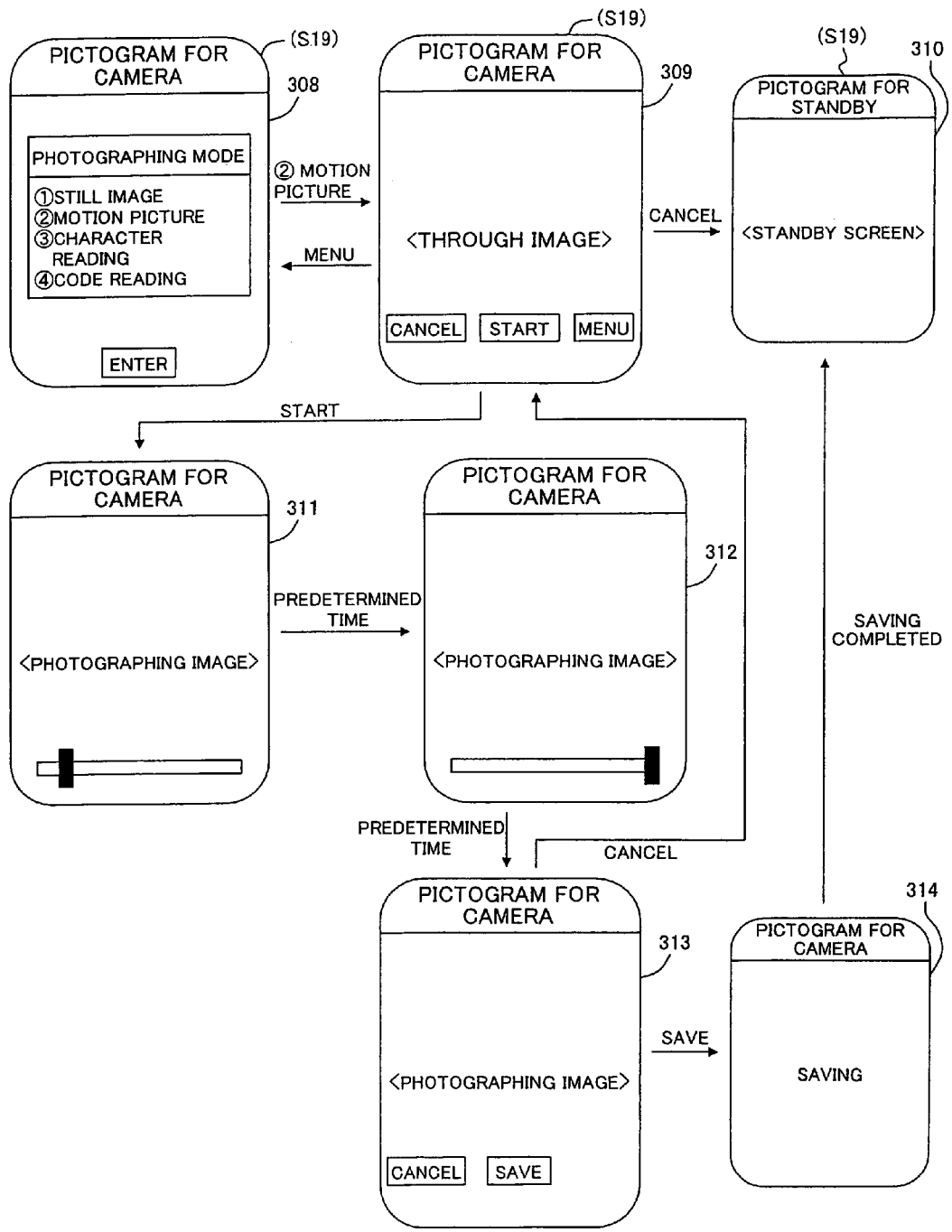
FIG. 22 shows contents displayed on display means in the flow of processing in a camera-equipped portable telephone comprising a focus state display apparatus according to a fifth embodiment of the present invention.

In a standby screen 301, when the device is set to a camera mode and a camera starting process is performed in step SI, the phrase "Camera is starting" is displayed on a display screen 302 (step S2). In step S3, when the camera start is completed, a through image is displayed on the display means (FIG. 21, 303). On this screen, "Press shutter", "Display menu", and "Cancel" can be selected. In step S4, a photographing image is saved in a first memory by overwriting. In this case, the first memory is what is called a buffer memory and the first memory temporarily saves image signals as an imaging target by constantly overwriting such image signals in the photographing operation. In step S5, the photographing image saved in the first memory is displayed on display means (309). When canceling the photographing, by selecting "Cancel", the process returns to a standby screen (standby mode) (310) in step S15. In this case, when performing a normal photographing in practice, step S7 is omitted (No in pressing a menu button), and a pressing operation is performed on a shutter button (Yes) in step S8.

Processing from steps S4 to S8 is repeated until the shutter button is pressed.

When the shutter button is pressed in step S8, a confirmation screen is displayed in step S9 (FIG. 21, 304). In this case, when "Cancel" is selected (step S10), the process returns to step S4. When "Save" is selected in step S11 instead of selecting "Cancel", "Saving" is displayed (306 of FIG. 21, 311 to 312 of FIG. 22). When "Cancel" is selected within a predetermined time during saving (No in step S11), the process returns to step S9. When the predetermined time has elapsed after selecting "Save", image data of the entire photographing image can be practically saved. In other words, in step S12, the photographing image saved in the first memory is compressed in JPEG format, for example, and in step S13, the compressed image data is saved in a second memory (such as a non-volatile memory card) (step S13, 313 to 314 of FIG. 22.) Then, when the process goes to step S14 to suspend the camera function, the process enters the standby mode in step S15 and display thereof is performed (step S15, 301 of FIG. 21, 310 of FIG. 22).

In step S7, when pressing the menu button is selected (Yes), the process goes to step S16 and a photographing submenu screen is displayed (FIG. 21, 305). On the submenu, for example, items "1" to "9" relating to photographing are displayed. In step S18, a desired item is selected from the displayed submenu, and in step S18, whether to switch photographing modes or not is determined. In a case where the switching of the photographing modes is not performed, the selected item is set. In a case where the switching of the photographing modes is performed (Yes), the process goes to step S19 and a photographing mode menu screen is displayed (FIG. 21, 307). In the photographing mode menu, items "1" to "4" are displayed, for example. Depending on which item is selected to perform a determination process, the process can go to any one of steps S21 to S24 (A to D of FIG. 16). When "Still image" in step S21 is selected, and then "Yes" is selected. the process returns to step S4 to perform processing.

Figure 16:
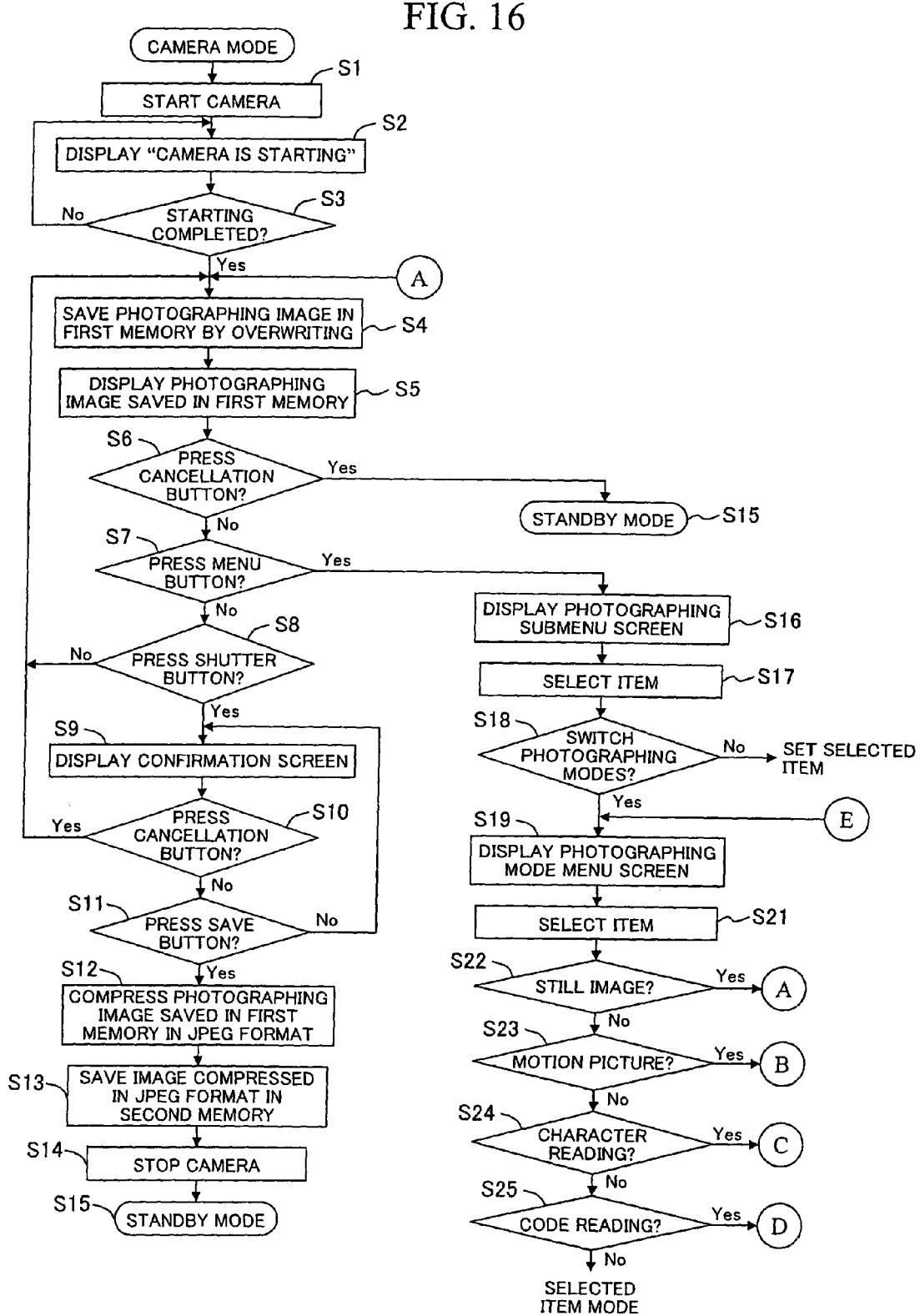
FIG. 16 shows a flow chart diagram describing, with the focus on an OCR function, the flow of processing in a camera-equipped portable telephone comprising a focus state display apparatus according to a fifth embodiment of the present invention.
Figure 17:
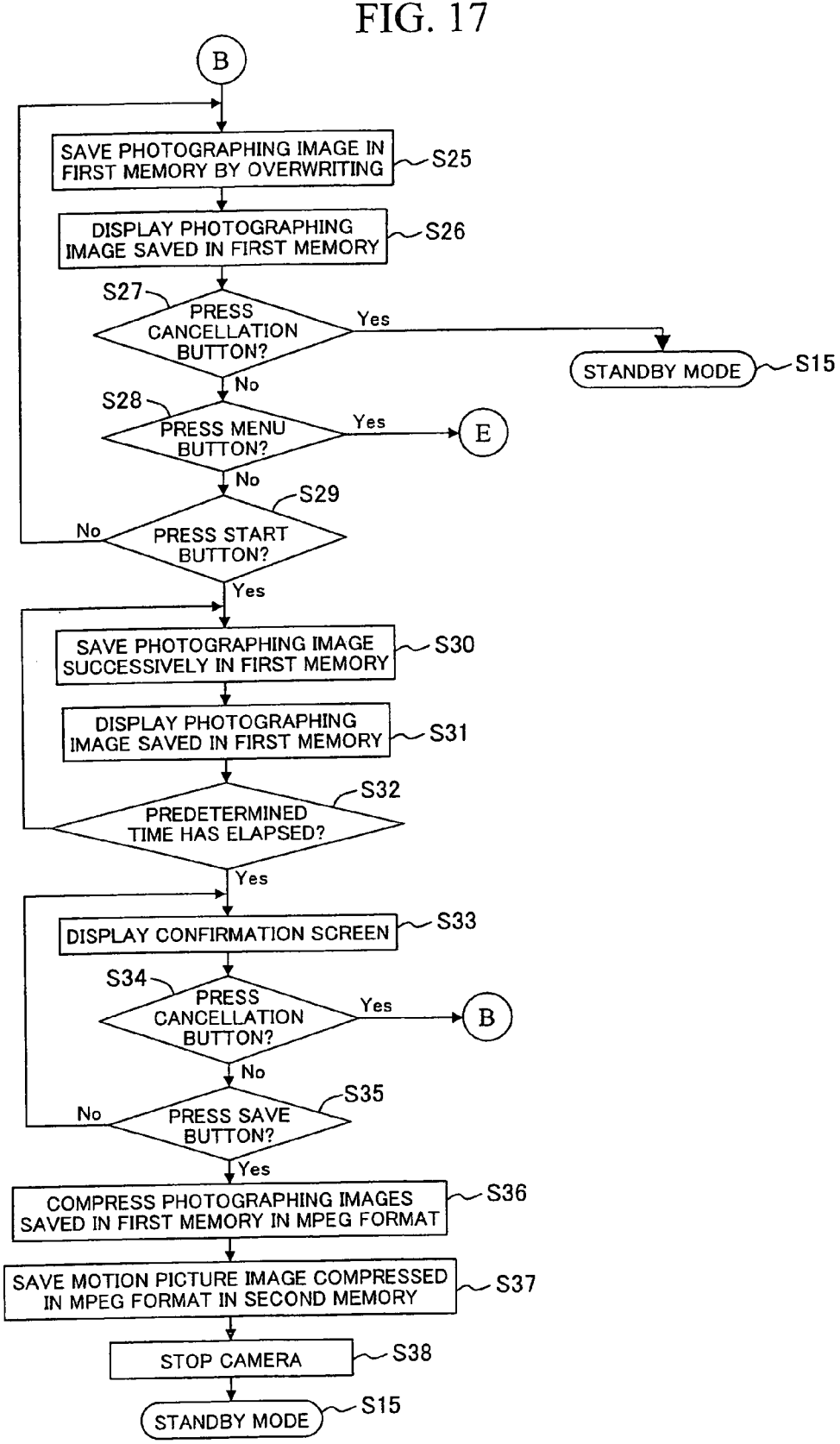
FIG. 17 shows a flow chart diagram describing, with the focus on an OCR function, the flow of processing in a camera-equipped portable telephone comprising a focus state display apparatus according to a fifth embodiment of the present invention.

When "Motion picture" in step S22 is selected, as shown in FIG. 17, the process goes to step S25 and a photographing image is saved in the first memory by overwriting. Next, in step S26, the photographing image saved in the first memory is displayed, and in step S27, whether to press the cancellation button or not is determined. If the cancellation button is pressed (Yes), the process returns to the standby mode in step S15. In a case where the cancellation button is not pressed (No), the process goes to step S28 and whether to press the menu button or not is determined. In the following steps S29 to S38, substantially the same processing as in steps S11 to S14 of FIG. 16 is performed regarding motion picture photographing, so that description in the flow chart diagram is omitted.

Figure 18:
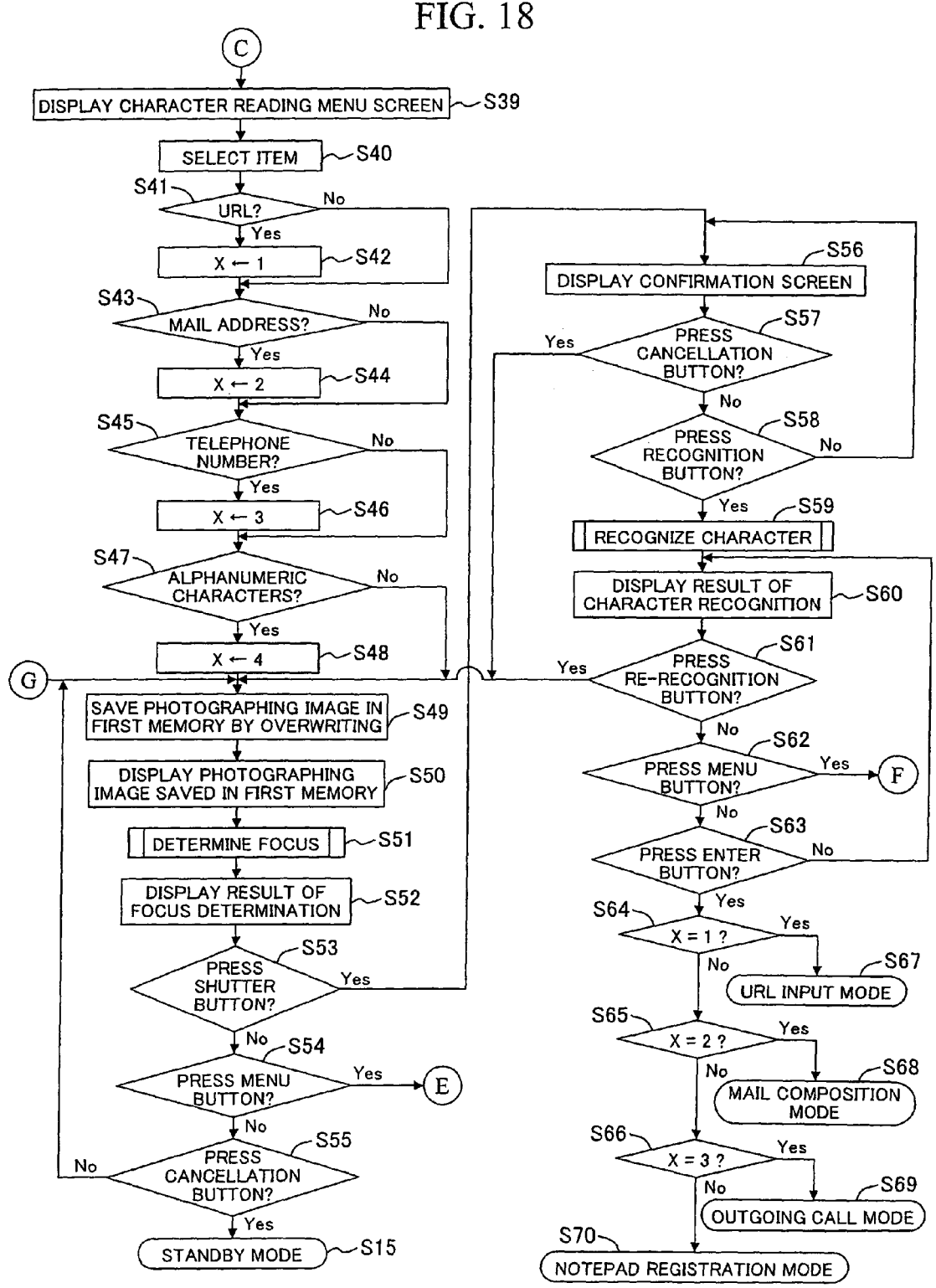
FIG. 18 shows a flow chart diagram describing, with the focus on an OCR function, the flow of processing in a camera-equipped portable telephone comprising a focus state display apparatus according to a fifth embodiment of the present invention.
Figure 23:
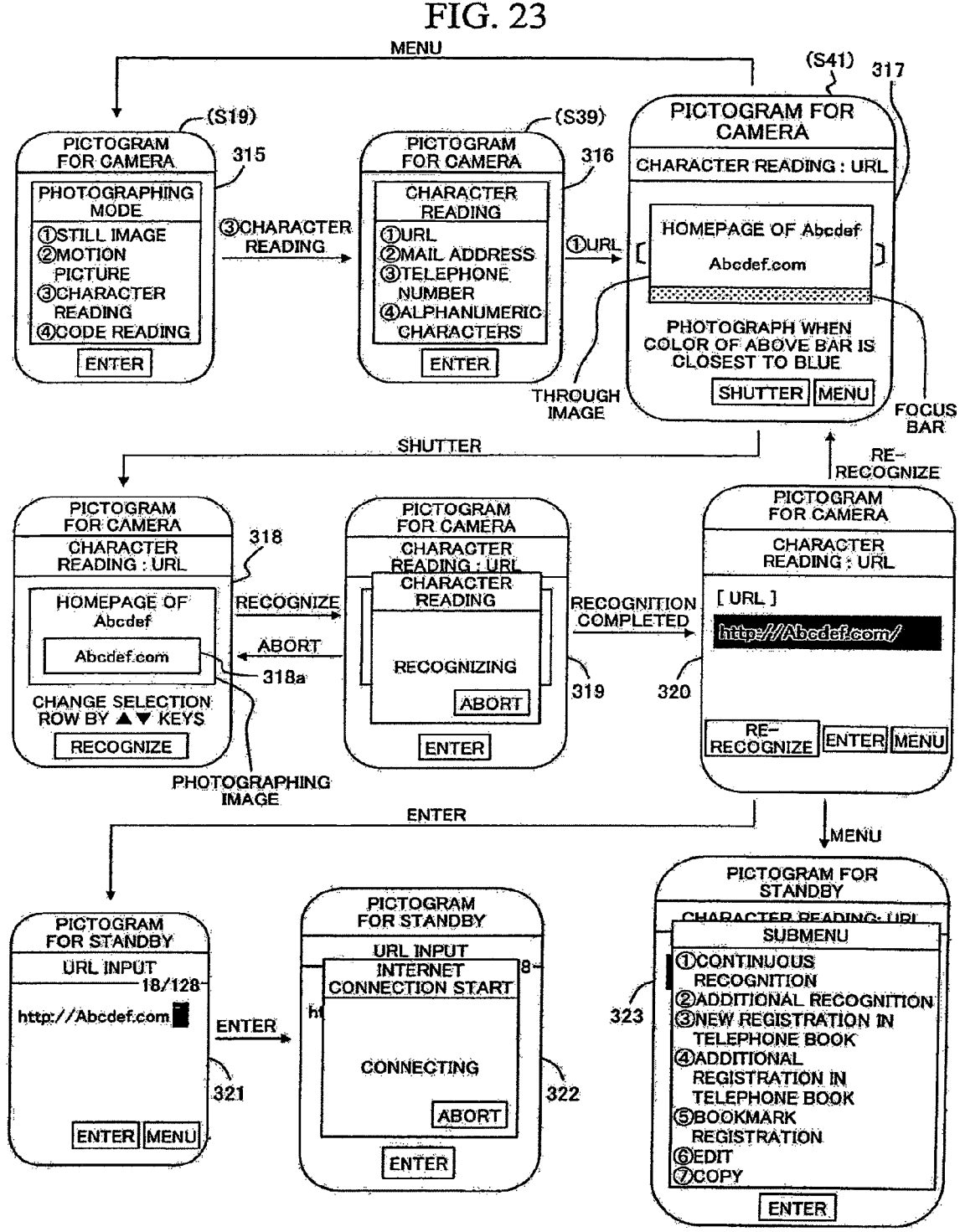
FIG. 23 shows contents displayed on display means in the flow of processing in a camera-equipped portable telephone comprising a focus state display apparatus according to a fifth embodiment of the present invention.
Figure 24:
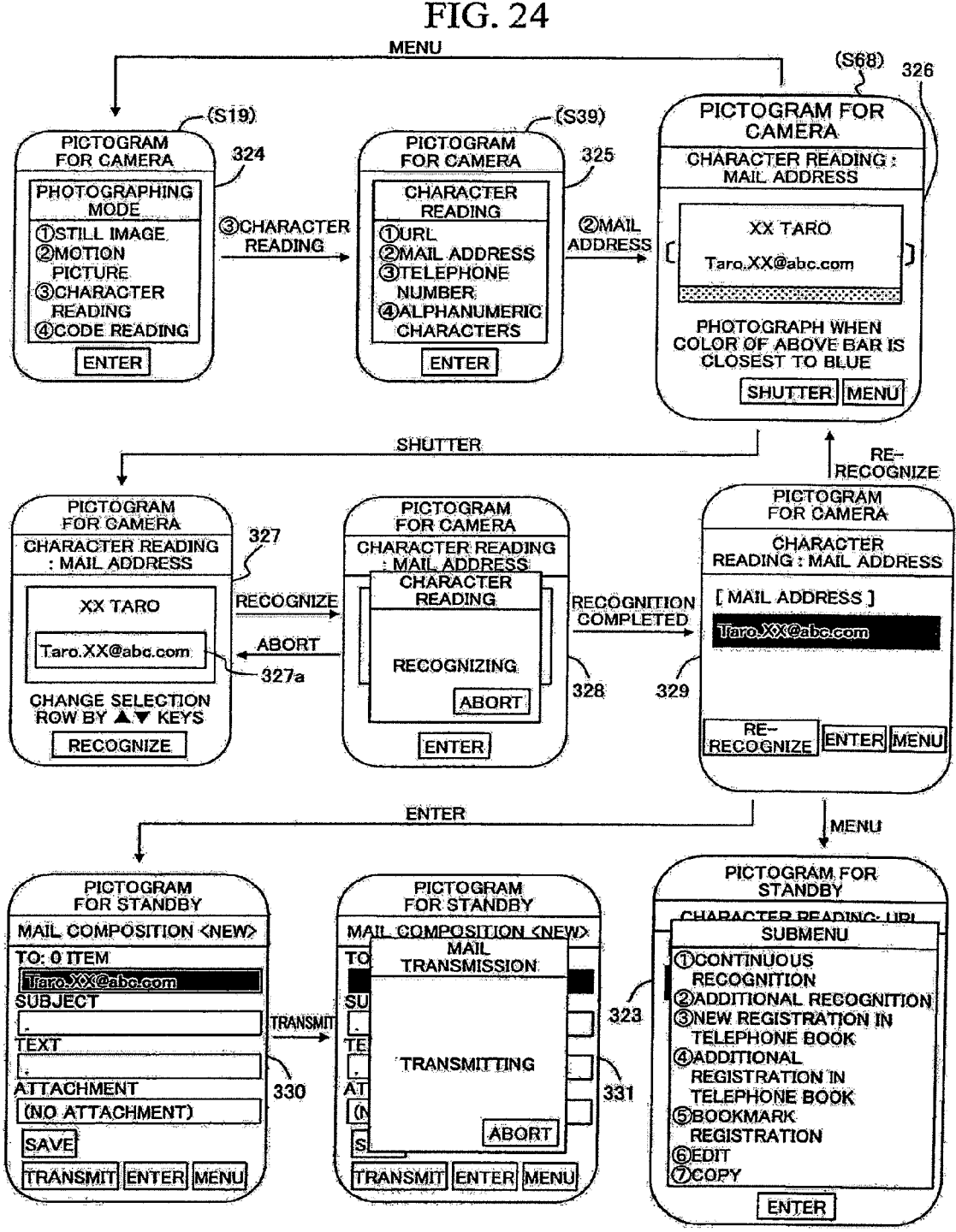
FIG. 24 shows contents displayed on display means in the flow of processing in a camera-equipped portable telephone comprising a focus state display apparatus according to a fifth embodiment of the present invention.

In step S24, when "Character reading" is selected (Yes, 315 of FIG. 23), the process goes to step S39 of FIG. 18, and a character reading menu screen is displayed (FIG. 23, 316). Items of character reading include "1" URL, "2" mail address, "3" phone number, and "4" alphanumeric characters, for example. Other items may be disposed.

In step S41, whether a URL is a target item of character reading or not is determined. In case of Yes, the process goes to step S42 and "1" is stored in an area X in a memory. In case of No in step S41, whether a mail address is the target item of character reading or not is determined. In case of Yes, the process goes to step S43 and "2" is stored in the memory area X. In case of No in step S43, the process goes to step S45 and whether a telephone number is the target item of character reading or not is determined. In case of Yes, the process goes to step S46 and "3" is stored in the memory area X. In case of No in step S45, the process goes to step S47 and whether alphanumeric characters are the target item of character reading or not is determined. In case of Yes, the process goes to step S48 and "4" is stored in the memory area X. In case of No in step S47, the process goes to step S49.

In step S49, a photographing image is saved in the first memory by overwriting and in step S50, and in step S50, the photographing image saved in the first memory is displayed on the display means. In this occasion, as shown on a display screen 317 of FIG. 23, for example, "abcdef.com", which is a photographing target representing the URL of the homepage of Abcdef, is displayed as a through image, and also a focus bar is displayed. For example, the message "Photograph when the color of the focus bar is closest to blue" is displayed, and the user can confirm the focus state in accordance with this display. In other words, from step S51, the determination of focus is performed and in step S52, the result of the focus determination is displayed. The focus determination and the result display thereof may be performed by processing described in each of the aforementioned embodiments. When the focus is confirmed, whether to press the shutter button or not is determined (step S53). In case of No in step S53, whether to press the menu button or not is determined in step S54. In a case where the menu button is pressed (Yes), the process returns to step S19 of FIG. 16 and the photographing mode menu screen is displayed. In a case where the menu button is not pressed (No), in step S55, whether to press the cancellation button or not is determined. In case of No in step S55, the process returns to step S49. In case of Yes, the process returns to step S15 and enters the standby mode.

In case of Yes in step S53, the process goes to step S56 and the photographing image of "abcdef.com" is displayed in a rectangular area 318a as shown on a display screen 318 of FIG. 23.

Next, in step S57, whether to press the cancellation button or not is determined. In case of Yes, the process returns to step S49. In case of No, the process goes to step S58 and whether to press a recognition button or not is determined. In case of No, the process returns to step S56. In case of Yes, in step S59, a character recognition process is performed via an OCR function, and in step S60, the result of the character recognition is displayed on the display means. Then, the process goes to step S61 and whether re-recognition is necessary or not is determined depending on the recognition result. In case of Yes, the process returns to step S49. In case of No, the process goes to step S62. In step S62, whether to press the menu button or not is determined. In case of Yes, the process goes to step S71 of FIG. 19. In case of No, the process goes to step S63 and whether to press an enter button or not is determined. In case of No, the process returns to step S60. In case of Yes, the process goes to step S64. In step S64, whether "1" is stored in the aforementioned memory area X or not is determined. In case of Yes, the process goes to a URL input mode in step S67. In case of No, the process goes to step S65 and whether "2" is stored in the aforementioned memory area X or not is determined. In case of Yes, the process goes to a mail composition mode in step S68. In case of No, the process goes to step S66 and whether "3" is stored in the aforementioned memory area X or not is determined. In case of Yes, the process goes to an outgoing call mode in step S69. In case of No, the process goes to a notepad registration mode in step S70.

Figure 19:
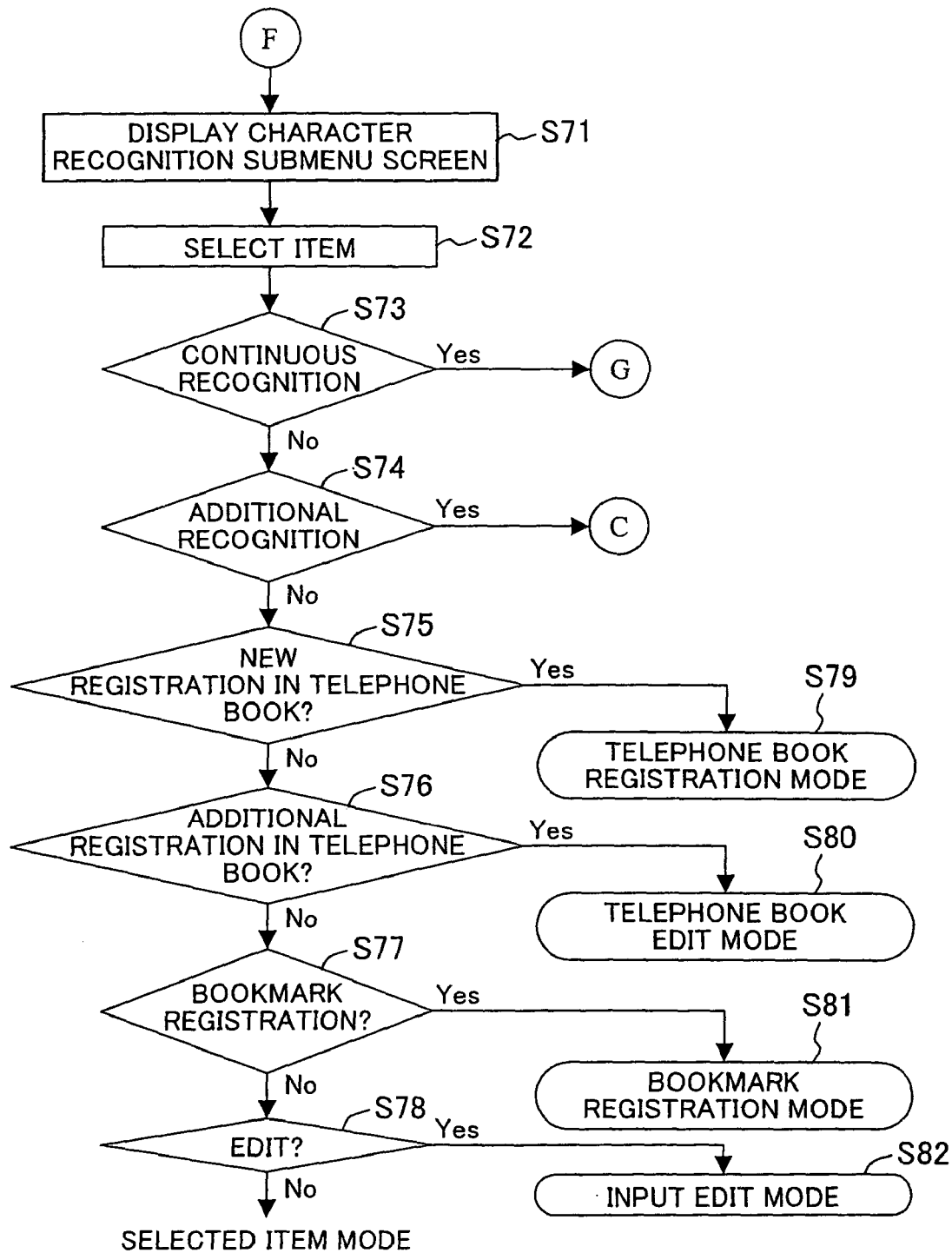
FIG. 19 shows a flow chart diagram describing, with the focus on an OCR function, the flow of processing in a camera-equipped portable telephone comprising a focus state display apparatus according to a fifth embodiment of the present invention.

As shown in FIG. 19, in step S71, a character recognition submenu screen is displayed (FIG. 23, 323). Any one of items is selected from "1" to "7" of the character recognition submenu in step S72, and from the aforementioned "1" to "6" in steps S73 to S78. For example, in continuous recognition in step S73, when "1 Continuous recognition" is selected, the process goes to step S49. If this is not selected, in additional recognition in step S74, when "2 Additional recognition" is selected, the process goes to step S39. In new registration in a telephone book in step S75, when "3 New registration in the telephone book" is selected, the process goes to a telephone book registration mode in step S79. If this is not selected, in additional registration in a telephone book in step S76, when "4 Additional registration in the telephone book" is selected, the process goes to a telephone book edit mode in step S80. If this is not selected, in bookmark registration in step S77, when "Bookmark registration" is selected, the process goes to a bookmark registration mode. If this is not selected, the process goes to edit selection in step S78. When "Edit" is selected, the process goes to an input edit mode in step S82. If "Edit" is not selected, the process goes to a mode of a selected item. Concrete processes and display of the aforementioned "1" to "3" are described in the following.

Figure 20:
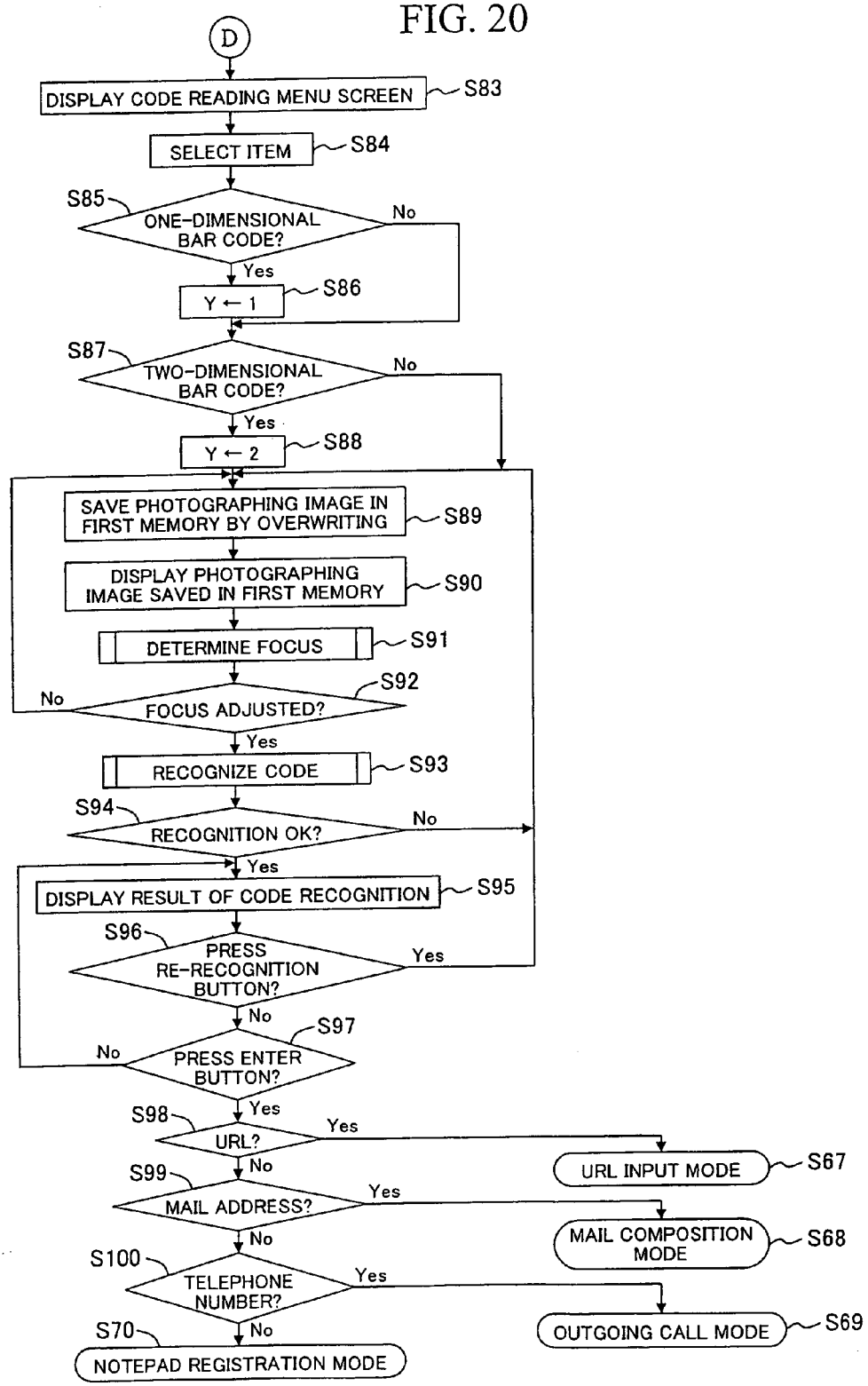
FIG. 20 shows a flow chart diagram describing, with the focus on an OCR function, the flow of processing in a camera-equipped portable telephone comprising a focus state display apparatus according to a fifth embodiment of the present invention.
Figure 27:
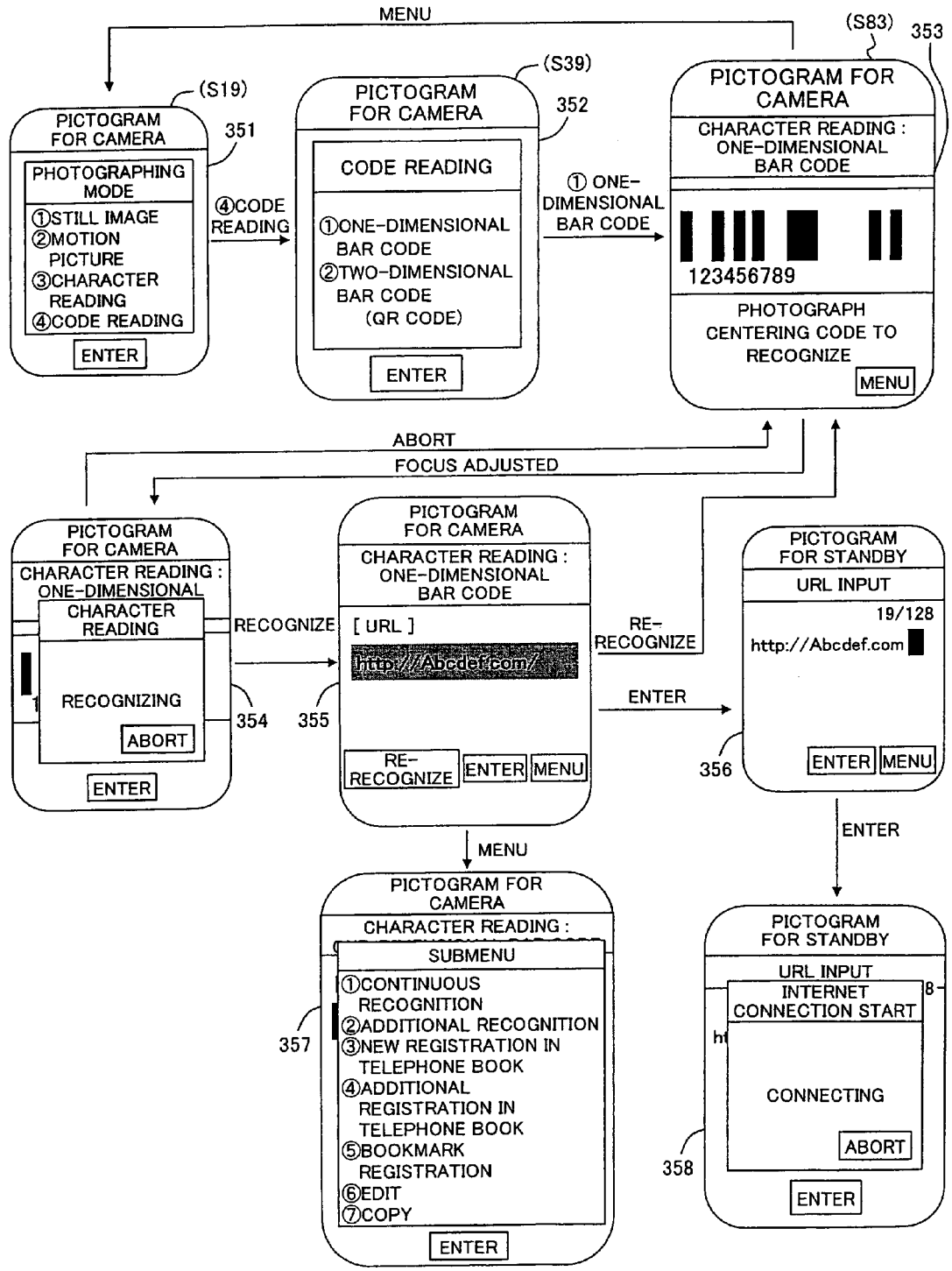
FIG. 27 shows contents displayed on display means in the flow of processing in a camera-equipped portable telephone comprising a focus state display apparatus according to a fifth embodiment of the present invention.
Figure 28:
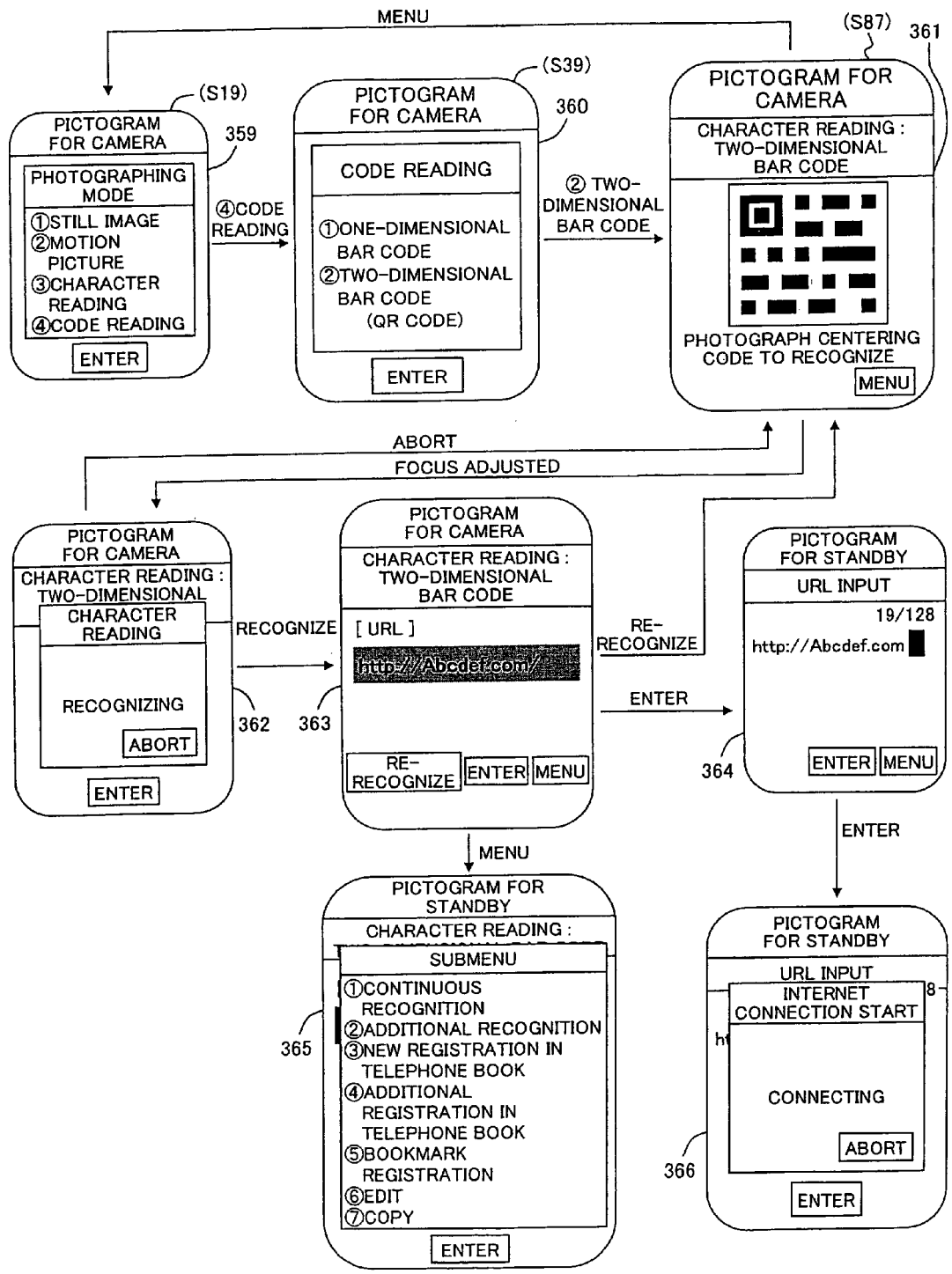
FIG. 28 shows contents displayed on display means in the flow of processing in a camera-equipped portable telephone comprising a focus state display apparatus according to a fifth embodiment of the present invention.
Figure 29:
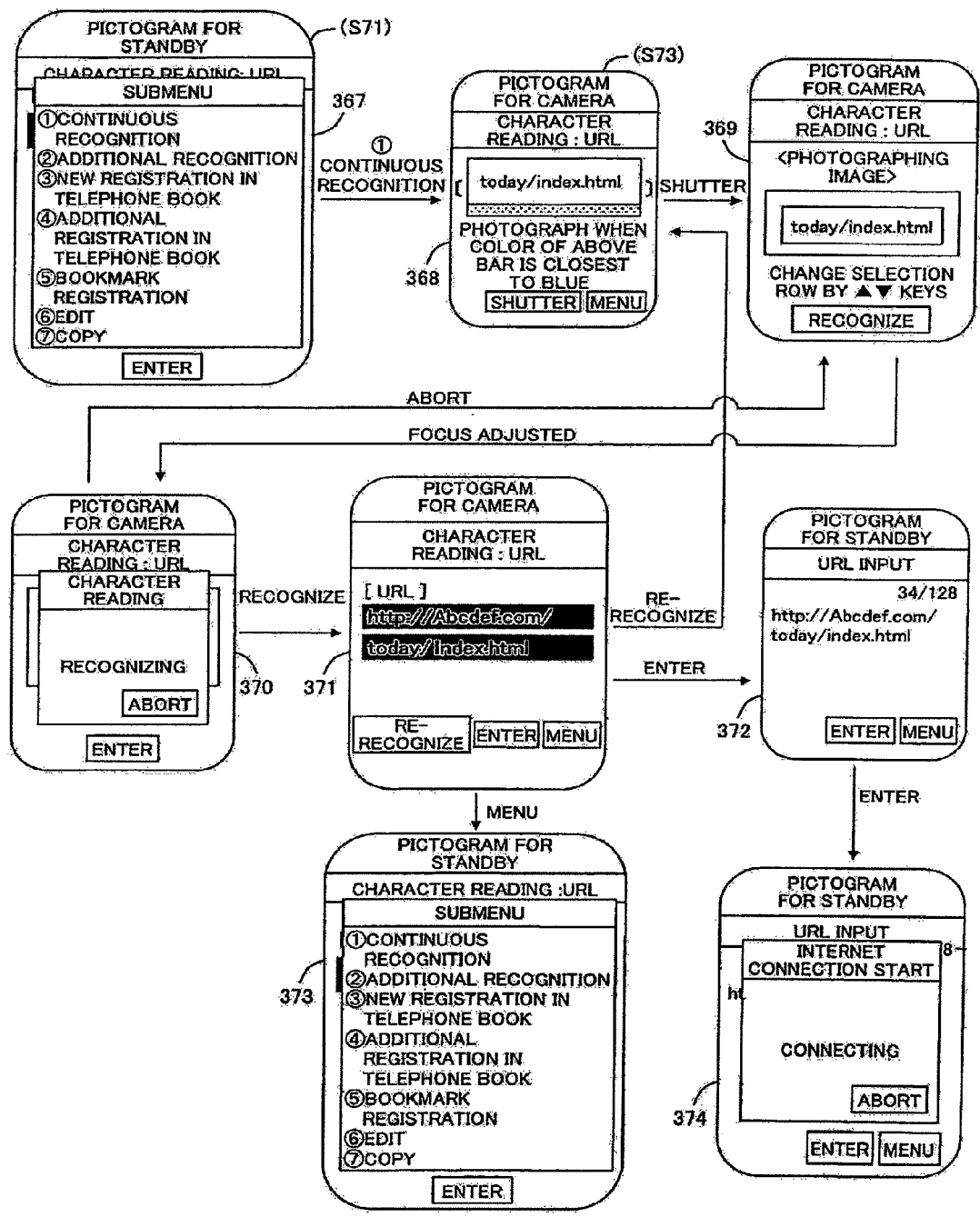
FIG. 29 shows contents displayed on display means in the flow of processing in a camera-equipped portable telephone comprising a focus state display apparatus according to a fifth embodiment of the present invention.
Figure 30:
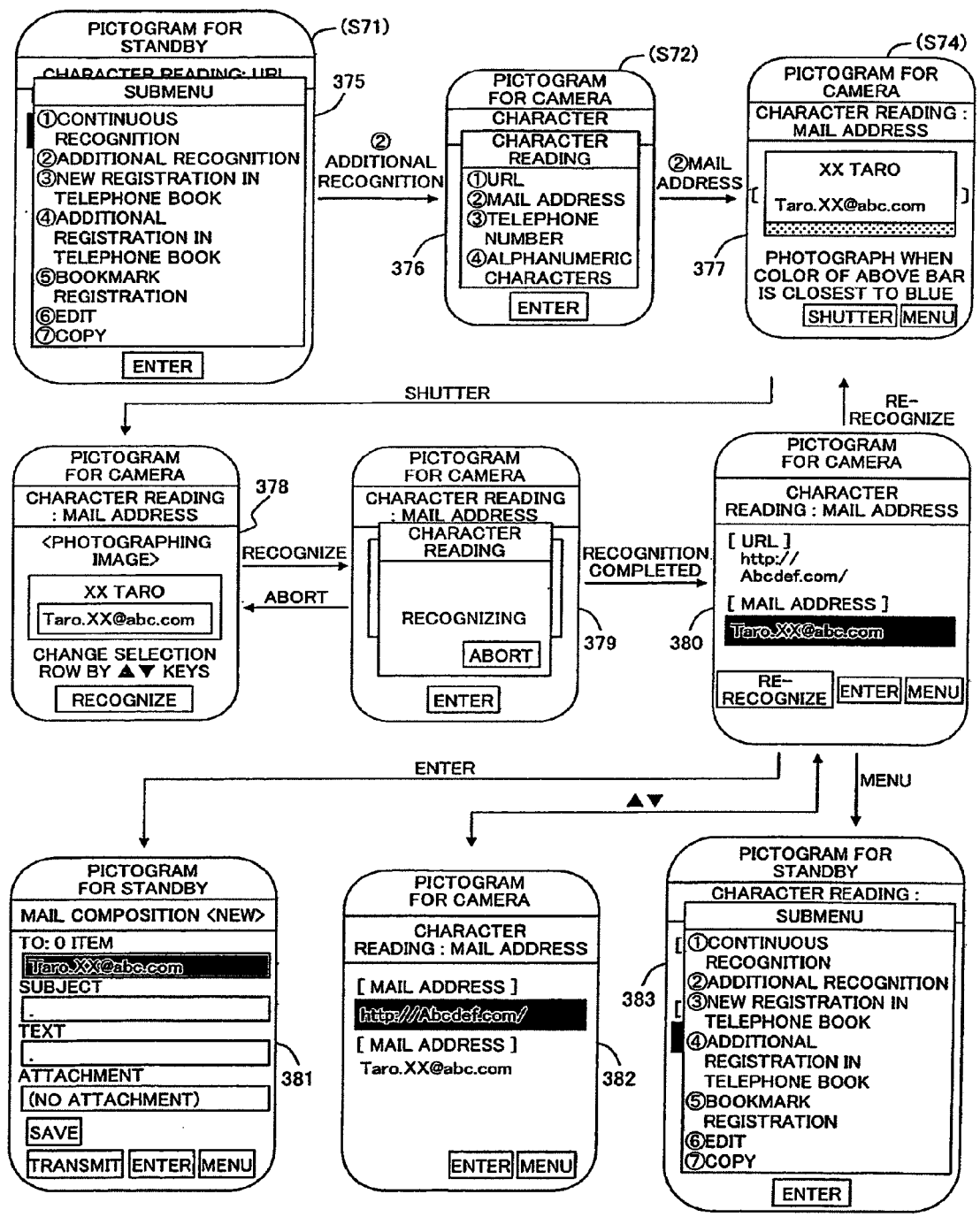
FIG. 30 shows contents displayed on display means in the flow of processing in a camera-equipped portable telephone comprising a focus state display apparatus according to a fifth embodiment of the present invention.

As shown in FIG. 20, in step S83 continuing from a code reading selection step of FIG. 16, a code reading menu screen is displayed (FIG. 27, 352). Examples of items include two types, namely, "1" a one-dimensional bar code and "2" a two-dimensional bar code (QR code). In step S85, whether to select reading of a one-dimensional bar code or not is determined. In a case where the reading of a one-dimensional bar code is selected, "1" is stored in a memory Y. Thereafter, or in a case where the reading of a one-dimensional bar code is not selected, the process goes to step S87 and whether to select reading of a two-dimensional bar code or not is determined. In a case where the reading of a two-dimensional bar code is selected, "2" is stored in the memory Y in step S88 and the process goes to step S89. In a case where the reading of a two-dimensional bar code is not selected, the process goes to step S89 without going through step S88.

Next, in step S89, a photographing image is saved in the first memory by overwriting, and in step S90, the photographing image saved in the first memory is displayed on the display means. In step S91, focus determination is performed. In step S92, whether the focus is adjusted or not is determined. In a case where the focus is unadjusted, the process returns to step S89. In a case where the focus is determined as adjusted, the process goes to step S93 and code recognition is performed. Whether the code recognition via the OCR function has succeeded or not is determined in step S94. If the code recognition has succeeded, the result of the code recognition is displayed in step S95 and the process goes to step S96. In this manner, by performing the code recognition process in the focus adjusted state where code recognition is possible, the processing burden of a CPU can be reduced and the decrease of a frame rate accompanied with the code recognition process can also be controlled to the minimum as compared with a case where the code recognition process is always performed.

Next, in step S96, whether to press a re-recognition button or not is determined. In other words, if the code recognition has not succeeded, the re-recognition button is pressed (Yes) and the process returns to step S89. If the result of the code recognition displayed on the display means is successful (No), the process goes to step S97 and whether to press the enter button or not is determined. In a case where the enter button is not pressed, the process returns to step S95. In a case where the enter button is pressed, the process goes to step S98. If information for identifying a URL is included in the result of the code recognition, the process can go to the URL input mode in step S67.

For example, in step S56, in the display screen 317 of FIG. 23, a URL is roughly positioned in [ ], and then the focus process is performed using the focus bar, followed by a process for pressing the shutter, thereby displaying the photographing image of "Abcdef.com" in the rectangular area 318a as shown on the display screen 318. In a case where a plurality of rows exist, it is possible to select a row to be subjected to the recognition process by a key operation, for example. By performing a process for deciding the recognition process, an OCR recognition process for reading characters (URL) is performed (319). When the recognition is completed, as shown on a display screen 320, the URL "http://Abcdef.com" obtained via the aforementioned procedure is displayed as an item of [URL]. By pressing the enter button, it is also possible to initiate an Internet connection process relative to this URL (322).

In a case where a mail address is prepared, the process can go to the mail composition mode (step S68) from step S99. For example, in step S68, in a display screen 326 of FIG. 24, a mail address is roughly positioned in [ ], and then the focus process is performed using the focus bar, followed by the process for pressing the shutter, thereby displaying the photographing image of "Taro.XX@abc.com" in a rectangular area 327a as shown on a display screen 327. In a case where a plurality of rows exist, it is possible to select a row to be subjected to the recognition process by a key operation, for example. By performing a process for deciding the recognition process, the OCR recognition process for reading characters (mail address) is performed (328). When the recognition is completed, as shown on a display screen 329, the mail address obtained via the aforementioned procedure is displayed as an item of [Mail address]. By pressing the enter button, a mail composition screen relative to a person who owns the mail address is displayed (330). In this case, by pressing "Transmit", it is possible to initiate the Internet connection process relative to this mail address and to transmit an electronic mail (331).

In a case where a telephone number is displayed, the process can go to the outgoing call mode in step S69 from step S100. Further, the process can go to the notepad registration mode in step S70.

Figure 25:
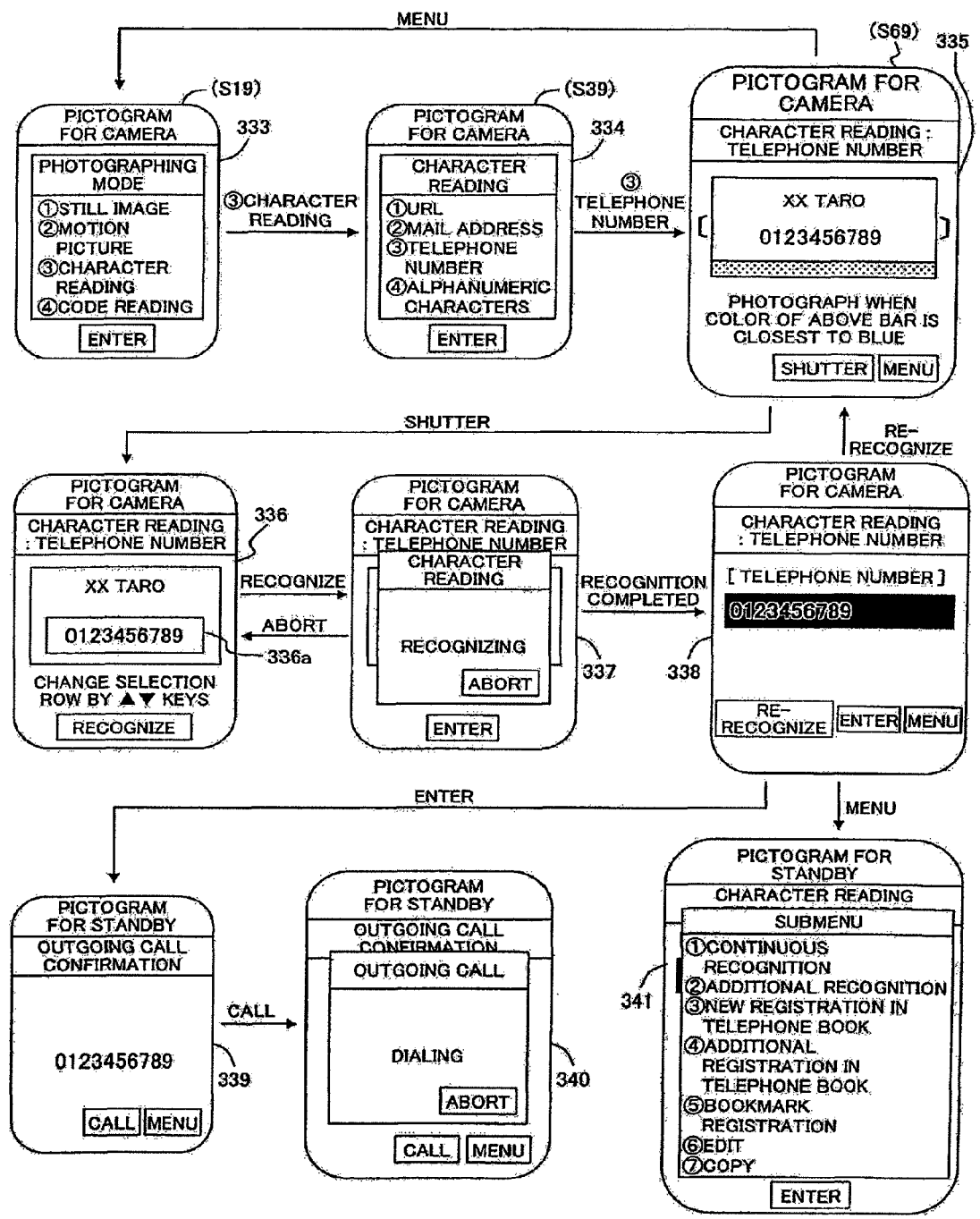
FIG. 25 shows contents displayed on display means in the flow of processing in a camera-equipped portable telephone comprising a focus state display apparatus according to a fifth embodiment of the present invention.

For example, in step S69, in a display screen 335 of FIG. 25, a telephone number is roughly positioned in [ ], and then the focus process is performed using the focus bar, followed by the process for pressing the shutter, thereby displaying the photographing image of "0123456789" in a rectangular area 336a as shown on a display screen 336. In a case where a plurality of rows exist, it is possible to select a row to be subjected to the recognition process by a key operation, for example. By performing a process for deciding the recognition process, the OCR recognition process for reading characters (telephone number) is performed (337). When the recognition is completed, as shown on a display screen 338, the telephone number obtained via the aforementioned procedure is displayed as an item of [Telephone number]. By pressing the enter button, an outgoing call confirmation screen relative to a person who owns the telephone number is displayed (339). In this case, by pressing "Call", an outgoing call process is initiated (340).

Figure 26:
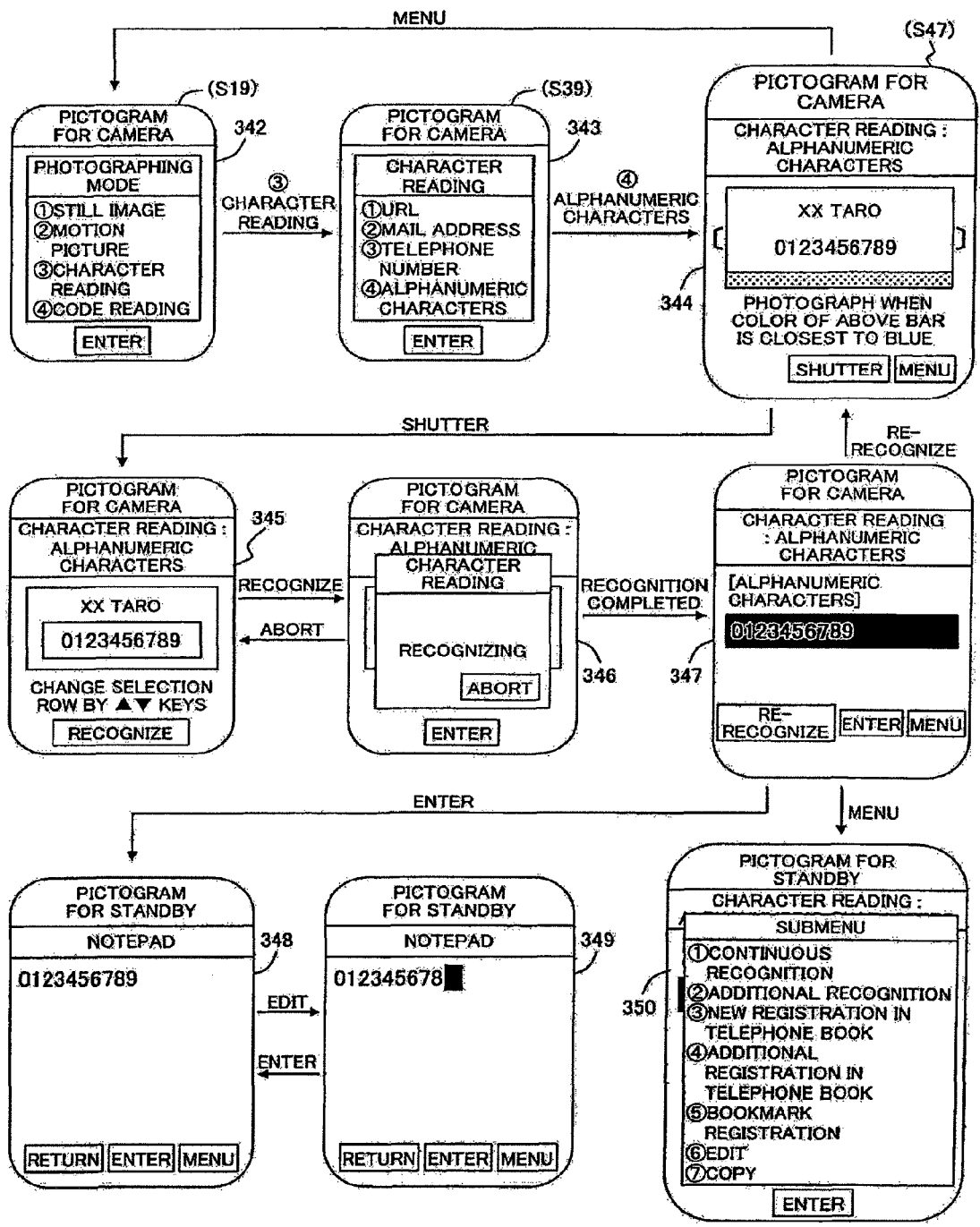
FIG. 26 shows contents displayed on display means in the flow of processing in a camera-equipped portable telephone comprising a focus state display apparatus according to a fifth embodiment of the present invention.

A recording process of alphanumeric characters in a notepad shown in FIG. 26 can be performed via the same procedure as in the aforementioned process (display screens 344 to 349). Detained description is omitted. The same applies to a URL input based on a one-dimensional bar code shown in FIG. 27 display screens 352 to 357 and a URL input based on a two-dimensional bar code shown in FIG. 28 display screens 360 to 366.

Next, in a case where a URL is inputted (321 of FIG. 23 or 364 of FIG. 28), when the URL practically comprises a further longer character string, it is necessary to input a continuous character string. In such a case, in step S71, a character recognition submenu screen is displayed (FIG. 29, 367), where "1 Continuous recognition" is selected and then decided. As shown on a display screen 368, a continuous character string "today/index.html" is photographed, and the focus is confirmed using the focus bar, followed by the press of the shutter, thereby enabling the OCR recognition of the character string "today/index.html" as shown in display screen 369 (370). When the recognition is completed, as shown on a display screen 371, the character string "http://Abcdef.com/today/index.html" where the continuous character string is connected is displayed. After the contents is confirmed, by pressing the enter button, the aforementioned URL can be obtained and stored in the portable telephone (372). In this case, by pressing the enter button, an Internet connection relative to the aforementioned URL can be performed (374). On the display screen 372, by displaying the menu, it is also possible to display the submenu again.

Next, after the URL is obtained, by selecting "2 Additional recognition" from the submenu display, it is possible to additionally register any of items "1" to "4" following the URL. For example, in a case where a mail address is registered from a display screen 376 in FIG. 30, by selecting and deciding "2 Mail address", as shown on a display screen 377, a mail address of XX Taro on a name card is photographed. In this case also, the focus state is confirmed using the focus bar, and "Taro.XX@abc.com" is photographed as shown on a display screen 378. In this case also, it is possible to change a selection row by a key operation. When a selection for enabling the OCR recognition is made, the recognition process is performed (379), and "Taro.XX@abc.com" can be obtained as a mail address (380).

On a display screen 380, when "Enter" is selected, a new mail composition screen is displayed (381). As shown on a display screen 382, it possible to move from a mail address to a row of URL, and to connect to the URL on the Internet, for example. Also, when the menu is displayed (display screen 383), items "1 " to "3", "6 ", and "7 " are displayed as selectable items and items "4 " and "5 " are displayed as unselectable items. Item "4 " is displayed as an unselectable item since additional recognition is performed and item "5 " is displayed as an unselectable item since the menu is displayed in a state where a mail address is selected.

Figure 31:
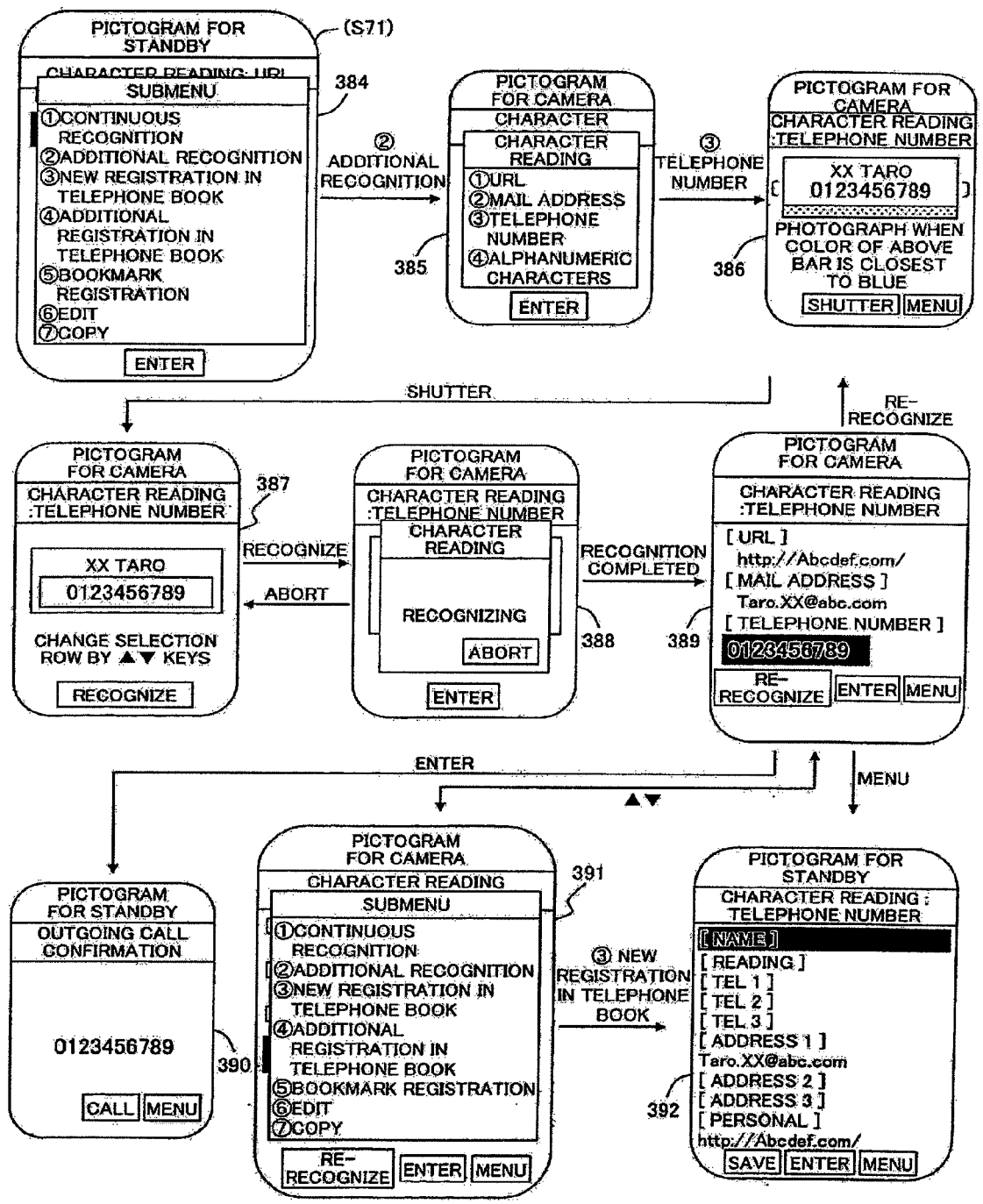
FIG. 31 shows contents displayed on display means in the flow of processing in a camera-equipped portable telephone comprising a focus state display apparatus according to a fifth embodiment of the present invention.

Thereafter, on a display screen 384 of FIG. 31, when "2 Additional recognition" is selected, for example, any one of character reading from "1 " to "4 " can be selected as shown on a display screen 385. In this case, when "3 ", namely, "Telephone number" is selected, as shown on a display screen 386, the telephone number of XX Taro "0123456789" is photographed and the focus bar is displayed. After the focus state is confirmed using the focus bar, by pressing the shutter, the telephone number can be photographed (387). In this case, a selection row can be changed moving up and down a plurality of rows. Next, by performing the OCR recognition process (385), as shown on a display screen 389, the telephone number obtained in the display position of a telephone number can be registered. In this case, when "Enter" is selected, as shown on a display screen 390, the outgoing call confirmation screen is displayed. When "Call" is selected, a process for practically making a phone call can be performed. When "Menu" is selected, the submenu is displayed (391). When "New registration in the telephone book" is selected, the telephone number can be registered as shown on a display screen 392. As shown on the display screen 392, it is possible to readily prepare an address book from one name card, the address book being capable of displaying a name, reading thereof, a telephone number, a mail address, a personal URL, and the like in a list. By using the function of "2 ", namely, "Additional recognition", after a URL, a mail address, a telephone number, and the like are successively recognized, it is possible to register all recognized data in a telephone book, for example.

As described above, according to the portable telephone of the present embodiment, upon photographing character data printed on a name card and the like using a camera, by notifying the user of the focus state using focus means, it is possible to readily learn the focus state. Thereafter, by photographing character data, for example, in a state where the focus is adjusted, and by recognizing the character data photographed in a good state using the OCR function, it is possible to readily obtain a relatively small and long character string, such as a URL, a mail address, and the like in the portable telephone. The focus state display apparatus and the focus state display method of the present invention have been described above with reference to each embodiment used in the camera-equipped portable telephone. However, the focus state display apparatus and the focus state display method of the present invention are not limited to the scope of these embodiments. A person skilled in the art is capable of adding various modifications and improvements to the focus state display apparatus and the focus state display method of the present invention without departing from the scope of the invention. Examples include display using colors, display using the shade of color, other graph display or display using characters, pictographic characters, and the like, and notification using a sound, vibration, or the like.

In each embodiment above, the focus state display apparatus is applied to a portable telephone, as an example. However, the apparatus may be applied to any devices, namely, portable information terminals such as PDAs, information processing devices such as portable personal computers, and the like, as long as the devices comprise a (built-in/external) camera. Further image data as an imaging target may be anything. Moreover, in each embodiment above, although names specified as the focus state display apparatus and the portable telephone are used, these are used for the sake of convenience of description. Thus, obviously, names such as a focusing state display apparatus, a communication terminal device, and a focusing state display method may be used.

Also, in each embodiment above, examples of display using graphic forms, symbols, characters, and the like on the LCD display portions 115 and 116 and of sound production via the loudspeakers 114 and 123 are described as display or notification means of the focus state. However, visual, acoustic, or other methods not involving the aforementioned examples may be used for a notification method. Various types of devices and each circuit portion thereof constituting the aforementioned portable telephone and focus state display apparatus, such as the types, the number, and the connection method of a memory portion and display portions are not limited to the aforementioned embodiments, so that any well-known structure may be employed.

The focus state display apparatus and the focus state display method of the present invention, and an apparatus such as a portable telephone provided therewith can be realized as a program for performing a function for displaying the aforementioned focus state. Although this program may be constituted such that it is embedded in each of the aforementioned devices in advance, it may be recorded in a computer-readable recording medium separately from each of the aforementioned devices.

In the present invention, as such a recording medium, a main memory per se may be a program medium. Also, a program reader such as a CD-ROM drive may be a program medium, which is disposed as an external memory device, where reading is possible by inserting a recording medium therein. In both cases, a stored program may be constituted such that it is executed through access via a CPU. Or, both cases use a method by which the program is read and the read program is downloaded into a program storage area that is not shown in the drawings, where the program is executed. A program for such downloading is stored in each device in advance.

The aforementioned program medium is a recording medium constituted such that it is separable from a portable terminal device or an information processing device. The program medium may be a magnetic disc such as a magnetic tape and a cassette tape, an optical disk such as CD-ROM, CD-R/RW, MO, MD, DVD-ROM, DVD-RAM, and DVD-RW, a card such as PC card, Compact Flash Card (registered trademark), SmartMedia (registered trademark), IC card, SD card (registered trademark), and Memory Stick (registered trademark), or a medium carrying a program in a fixed manner including a semiconductor memory such as Mask ROM, EPROM, EEPROM, and Flash ROM.

Further, the program medium may be a medium carrying a program in a fluid manner such that the program is downloaded from a communication network via communication connection means capable of connecting to an external communication network such as an Internet connection provider or a server terminal. In a case where the program is downloaded from a communication network in this manner, a program for downloading may be stored in advance or installed from other recording medium. Contents stored in the recording medium are not limited to a program, and the contents may be data.

In this manner, if the aforementioned program is recorded in a recording medium that is separable from a device body, upgrading of the program, updating for adding a new display form, and the like can be flexibly made relative to various types of devices comprising the focus state display apparatus and the focus state display method of the present invention. Thus, it becomes possible to provide a device that is even more convenient to the user.

INDUSTRIAL APPLICABILITY

As described above, according to the focus state display apparatus and the focus state display method of the present invention, focus information can be displayed visually or acoustically. Thus, it becomes possible for the user to readily confirm and adjust the focus.

If the focus state display apparatus having such superior characteristics is applied to portable terminal devices with a small monitor such as portable telephones, portable information terminals, and the like comprising an imaging device, the user can readily confirm the focus state, so that an image with accurately adjusted focus can be photographed.

Also, from photographing images of portable telephones and portable information terminals comprising an imaging device, it becomes possible to readily recognize characters and adjust the focus of binarized images such as bar codes and QR codes, thereby improving the accuracy of the character recognition and the recognition of the bar codes and QR codes.

Further, by using a focus display function and an OCR function, a long character string, for example, can be recognized with good accuracy.

The invention claimed is:

1. A portable terminal device comprising:
   a photography-target setting section operable to set a normal photography mode for photographing an image, and an OCR function mode for photographing a character or a bar code;
   a display unit operable to display a photographed image;
   a focused-state determination section operable to determine a focused state of a character or a bar code photographed in said OCR function mode;
   a recognition section operable to recognize the photographed character or bar code; and
   a recognized result memory section operable to store the result of recognition made by said recognition means, wherein,
   upon recognition by said recognition section, the result of recognition is displayed by said display unit, and
   when the displayed result of recognition is a URL, user confirmation of said displayed result of recognition transitions said portable terminal device directly into an Internet communications preparatory state having a communications destination field that is pre-populated during said transition with said just-recognized URL for connection to said URL via the Internet.

2. The portable terminal device according to claim 1, further comprising:
a photography mode switching section operable to switch between a normal mode and a macro mode in accordance with the setting of a photography-target by said photography-target setting means.

3. The portable terminal device according to claim 1, wherein said focused-state determination section is activated, and the photographed character or bar code is recognized by said recognition section.

4. The portable terminal device according to claim 1, wherein a state of focus sufficient for recognition of the photographed character or bar code is determined by said focused-state determination section, and the photographed character or bar code is recognized by said recognition section.

5. The portable terminal device according to claim 1, further comprising a notification section operable to provide a notice about the result of a focus state determination made by said focused-state determination section.

6. The portable terminal device according to claim 1, wherein a notice about the result of determination of a focus state made by said focused-state determination section is provided, and the photographed character or code is recognized.

7. The portable terminal device according to claim 1, wherein the portable terminal device is a portable cellular phone.

8. The portable terminal device according to claim 1, wherein, when the result of recognition made by said recognition section contains a plurality of items of data including a name, telephone number, and/or mail address, the recognized data is registered in a telephone directory all at the same time.

9. The portable terminal device according to claim 1, wherein, when a first confirmation input is detected by the portable terminal device, said portable terminal device initiates communications to the recognized URL.

10. A portable terminal device comprising:
a photography-target setting section operable to set a normal photography mode for photographing an image, and an OCR function mode for photographing a character or a bar code;
a display unit operable to display a photographed image;
a focused-state determination section operable to determine a focused state of a character or a bar code photographed in said OCR function mode;
a recognition section operable to recognize the photographed character or bar code; and
a recognized result memory section operable to store the result of recognition made by said recognition means, wherein,
upon recognition by said recognition section, the result of recognition is displayed by said display unit, and
when the displayed result of recognition is a mail address, user confirmation of said displayed result of recognition transitions the portable terminal device directly to a mail creation state wherein a mail destination field of the created mail is pre-populated during said direct transition with said just-recognized mail address.

11. The portable terminal device according to claim 10, wherein, when a first confirmation input is detected by the portable terminal device, said portable terminal device initiates communications to the recognized mail address.

12. A portable terminal device comprising:
a photography-target setting section operable to set a normal photography mode for photographing an image, and an OCR function mode for photographing a character or a bar code;
a display unit operable to display a photographed image;
a focused-state determination section operable to determine a focused state of a character or a bar code photographed in said OCR function mode;
a recognition section operable to recognize the photographed character or bar code; and
a recognized result memory section operable to store the result of recognition made by said recognition means, wherein,
upon recognition by said recognition section, the result of recognition is displayed by said display unit, and
when the displayed result of recognition is a telephone number, user confirmation of said displayed result of recognition transitions the portable terminal device directly to a phone state wherein a recipient phone number field is pre-populated during said direct transition with said lust-recognized telephone number.

13. The portable terminal device according to claim 12, wherein, when a first confirmation input is detected by the portable terminal device, said portable terminal device initiates communications to the recognized telephone number.

* * * * *

UNITED STATES PATENT AND TRADEMARK OFFICE
CERTIFICATE OF CORRECTION

PATENT NO. : 7,889,267 B2  
APPLICATION NO. : 11/600209  
DATED : February 15, 2011  
INVENTOR(S) : Yoshio Hagino Page 1 of 1

It is certified that error appears in the above-identified patent and that said Letters Patent is hereby corrected as shown below:

ON THE TITLE PAGE:

At item (62), correct the Related U.S. Application Data to read as follows:

-- Related U.S. Application Data

(62) Division of application No. 10/544,727, filed as application No. PCT/JP2004/000336 on Jan. 16, 2004, now Pat. No. 7,893,987. --

Insert the following Foreign Application Priority Data:

-- (30) Foreign Application Priority Data

Feb. 7, 2003 (JP) ........................ 2003-031066  
Jun. 3, 2003 (JP) ........................ 2003-158476 --.

Signed and Sealed this  
Tenth Day of May, 2011

David J. Kappos  
*Director of the United States Patent and Trademark Office*